US012202669B2

(12) United States Patent
Miller et al.

(10) Patent No.: US 12,202,669 B2
(45) Date of Patent: Jan. 21, 2025

(54) REFUSE VEHICLE WITH ADVANCED DRIVER-ASSISTANCE SYSTEM

(71) Applicant: Oshkosh Corporation, Oshkosh, WI (US)

(72) Inventors: Amanda Miller, Oshkosh, WI (US); Brendan Chan, Oshkosh, WI (US); Jon Zeamer, Oshkosh, WI (US); Greg Steffens, Oshkosh, WI (US); James Tebbe, Oshkosh, WI (US); Jeremy Andringa, Oshkosh, WI (US); Jon Branson, Oshkosh, WI (US); Ryan Wolf, Oshkosh, WI (US); Sam Mueller, Oshkosh, WI (US); Ben Fischer, Oshkosh, WI (US); Jeff Verhagen, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 92 days.

(21) Appl. No.: 17/987,105

(22) Filed: Nov. 15, 2022

(65) Prior Publication Data

US 2023/0150763 A1 May 18, 2023

Related U.S. Application Data

(60) Provisional application No. 63/280,899, filed on Nov. 18, 2021.

(51) Int. Cl.
*B65F 3/04* (2006.01)
*B65F 3/02* (2006.01)

(52) U.S. Cl.
CPC ........ *B65F 3/046* (2013.01); *B65F 2003/025* (2013.01)

(58) Field of Classification Search
CPC ........................... B65F 3/046; B65F 2003/025
See application file for complete search history.

(56) References Cited

U.S. PATENT DOCUMENTS 8,139,109 B2 * 3/2012 Schmiedel ........... H04N 13/243 348/148
10,633,181 B2 * 4/2020 Butcher .................... B65F 3/00
(Continued)

OTHER PUBLICATIONS https://info.macktrucks.com/refuse-revolution; "Welcome to the refuse revolution. Mack LR Electric." Retrieved on Mar. 21, 2023.
(Continued)

*Primary Examiner* — Jonathan Snelting
(74) *Attorney, Agent, or Firm* — Foley & Lardner LLP

(57) ABSTRACT

A refuse vehicle includes a chassis coupled a wheel, a motor configured to drive the wheel, a body assembly coupled to the chassis and defining a refuse compartment, a lift assembly, and a vehicle control system having a sensor integrated into the body assembly and a controller in communication with the lift assembly and the sensor. The controller includes a processor and at least one memory and is configured to receive sensor data from the sensor, the sensor data indicating a potential event, receive control data indicating a state the lift assembly, and compare the sensor data to the control data to determine if the potential event is a false event associated with the state of the lift assembly or an actual event.

16 Claims, 22 Drawing Sheets

(56) References Cited

U.S. PATENT DOCUMENTS

| | | | | |
|---|---|---|---|---|
| 2005/0113996 | A1* | 5/2005 | Pillar | G06Q 10/08 701/36 |
| 2009/0079839 | A1 | 3/2009 | Fischer et al. | |
| 2012/0245798 | A1* | 9/2012 | Coats | G01S 15/86 701/42 |
| 2015/0151651 | A1 | 6/2015 | Stingle et al. | |
| 2016/0375805 | A1 | 12/2016 | Krueger et al. | |
| 2019/0276102 | A1 | 9/2019 | Zuleger et al. | |
| 2019/0325220 | A1* | 10/2019 | Wildgrube | G06V 20/58 |
| 2020/0247486 | A1 | 8/2020 | Groteleuschen et al. | |
| 2020/0256649 | A1 | 8/2020 | Krueger et al. | |
| 2020/0290236 | A1 | 9/2020 | Bjornstad et al. | |
| 2020/0290237 | A1 | 9/2020 | Steffens et al. | |
| 2020/0290238 | A1 | 9/2020 | Andringa et al. | |
| 2020/0291846 | A1 | 9/2020 | Steffens et al. | |
| 2021/0171137 | A1 | 6/2021 | Zuleger et al. | |
| 2021/0192234 | A1* | 6/2021 | Chen | B60W 60/001 |
| 2021/0276643 | A1 | 9/2021 | Ellifson et al. | |
| 2021/0292086 | A1 | 9/2021 | Mahan et al. | |
| 2021/0323763 | A1 | 10/2021 | Koga et al. | |
| 2021/0323764 | A1 | 10/2021 | Koga et al. | |
| 2021/0323765 | A1 | 10/2021 | Koga et al. | |
| 2021/0325529 | A1 | 10/2021 | Koga et al. | |
| 2021/0325911 | A1 | 10/2021 | Koga et al. | |
| 2021/0345062 | A1 | 11/2021 | Koga et al. | |
| 2021/0354329 | A1 | 11/2021 | Hou et al. | |
| 2021/0373560 | A1 | 12/2021 | Koga et al. | |
| 2022/0033181 | A1 | 2/2022 | Koga et al. | |
| 2022/0072736 | A1 | 3/2022 | Steffens et al. | |
| 2022/0097527 | A1 | 3/2022 | Koga et al. | |
| 2022/0097961 | A1 | 3/2022 | Koga et al. | |
| 2022/0097964 | A1 | 3/2022 | Koga et al. | |
| 2022/0118854 | A1 | 4/2022 | Davis et al. | |
| 2022/0134372 | A1 | 5/2022 | Andringa | |
| 2022/0134856 | A1 | 5/2022 | Andringa et al. | |
| 2022/0185582 | A1 | 6/2022 | Koga et al. | |
| 2022/0260344 | A1 | 8/2022 | Krueger et al. | |
| 2022/0289290 | A1 | 9/2022 | Andringa et al. | |
| 2023/0002152 | A1 | 1/2023 | Koga et al. | |

OTHER PUBLICATIONS https://www.youtube.com/watch?v=NQFtAnm7D-c; "All-New Mack LR Electric Garbage Truck." Retrieved on Mar. 21, 2023.

* cited by examiner

REFUSE VEHICLE WITH ADVANCED DRIVER-ASSISTANCE SYSTEM

CROSS-REFERENCE TO RELATED PATENT APPLICATIONS

This application claims the benefit of and priority to U. S. Provisional Application No. 63/280,899, filed Nov. 18, 2021, the entire disclosure of which is hereby incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

At least one embodiment relates to a refuse vehicle. The refuse vehicle includes a chassis coupled a wheel, a motor configured to drive the wheel, a body assembly coupled to the chassis and defining a refuse compartment, a lift assembly, and a vehicle control system having a sensor integrated into the body assembly and a controller in communication with the lift assembly and the sensor. The controller includes a processor and at least one memory and is configured to receive sensor data from the sensor, the sensor data indicating a potential event, receive control data indicating a state the lift assembly, and compare the sensor data to the control data to determine if the potential event is a false event associated with the state of the lift assembly or an actual event.

Another embodiment relates to a refuse vehicle that includes a chassis, a body assembly coupled to the chassis and defining a refuse compartment, a lift assembly, a refuse container configured to selectively couple to the lift assembly and having a carry can sensor, and a vehicle control system having a vehicle sensor integrated into the body assembly and a controller in communication with the lift assembly, the carry can sensor, and the vehicle sensor. The controller includes a processor and at least one memory and is configured to determine that the lift assembly is in a collection mode and in response to determining that the lift assembly is in the collection mode, deactivate the vehicle sensor and activate the carry can sensor.

Another embodiment relates to a refuse vehicle that includes a chassis, a cab supported by the chassis, a body assembly coupled to the chassis and defining a refuse compartment, a lift assembly, and a vehicle control system having a vehicle sensor integrated into the body assembly and a front camera mounted to the cab. The front camera defines a field of view that intersects with a ground plane. A predefined vision distance defined between the front camera and a point where the field of view intersects with the ground plane is less than or equal to about 7 meters.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vocational vehicle (e.g., refuse truck, refuse vehicle, mixer vehicle, fire fighting vehicle, etc.) includes a vehicle control system configured to operate as an advanced driver-assistance system (ADAS). The ADAS system includes one or more sensors positioned in and around the vocational vehicle. In some embodiments, the sensors include a three hundred sixty degree camera system, a three hundred sixty degree radar system, and a forward collision detection system. Further, the ADAS system can include sensors for monitoring an activity of the vocational vehicle. For example, the sensors may monitor a refuse collection mode of a refuse vehicle including monitoring the position of a lift assembly and the contents of a refuse compartment. In some embodiments, the ADAS system can filter the sensor data through the vehicle controls to identify false events. The false events can be due to the position of components of the vocation vehicle itself that are detected by the sensors. For example, a forward facing radar sensor may detect an object in front of the refuse vehicle, but the ADAS system can compare the sensor data to vehicle control data to determine the object that is detected is a lift assembly of the vocational vehicle, and the ADAS system can disregard the data. In one embodiment, the sensors are integrated into a body of the vocational vehicle. In some embodiments, the exterior of the vocational vehicle can be modified to include radar-friendly materials at select locations in front of the sensors to facilitate operation of the radar sensors. In some embodiments, the ADAS system can detect operation modes, allowing for (a) automatic adjustment to a user interface of the ADAS system, and (b) automatic driver-assistance, based on the detected mode. For example, the ADAS system can provide a view on a console display of a hopper camera and curbside camera when a collection mode is detected, and a view of a different combination of video feeds in a forward travel mode. In some embodiments, the ADAS system combines vocational activity awareness and ADAS operations into a single user interface system that can include an instrument cluster display and a main console display. The ADAS controls the displays in tandem providing each display with context-specific information based on the detected mode.

Overall Vehicle

Figure 1:
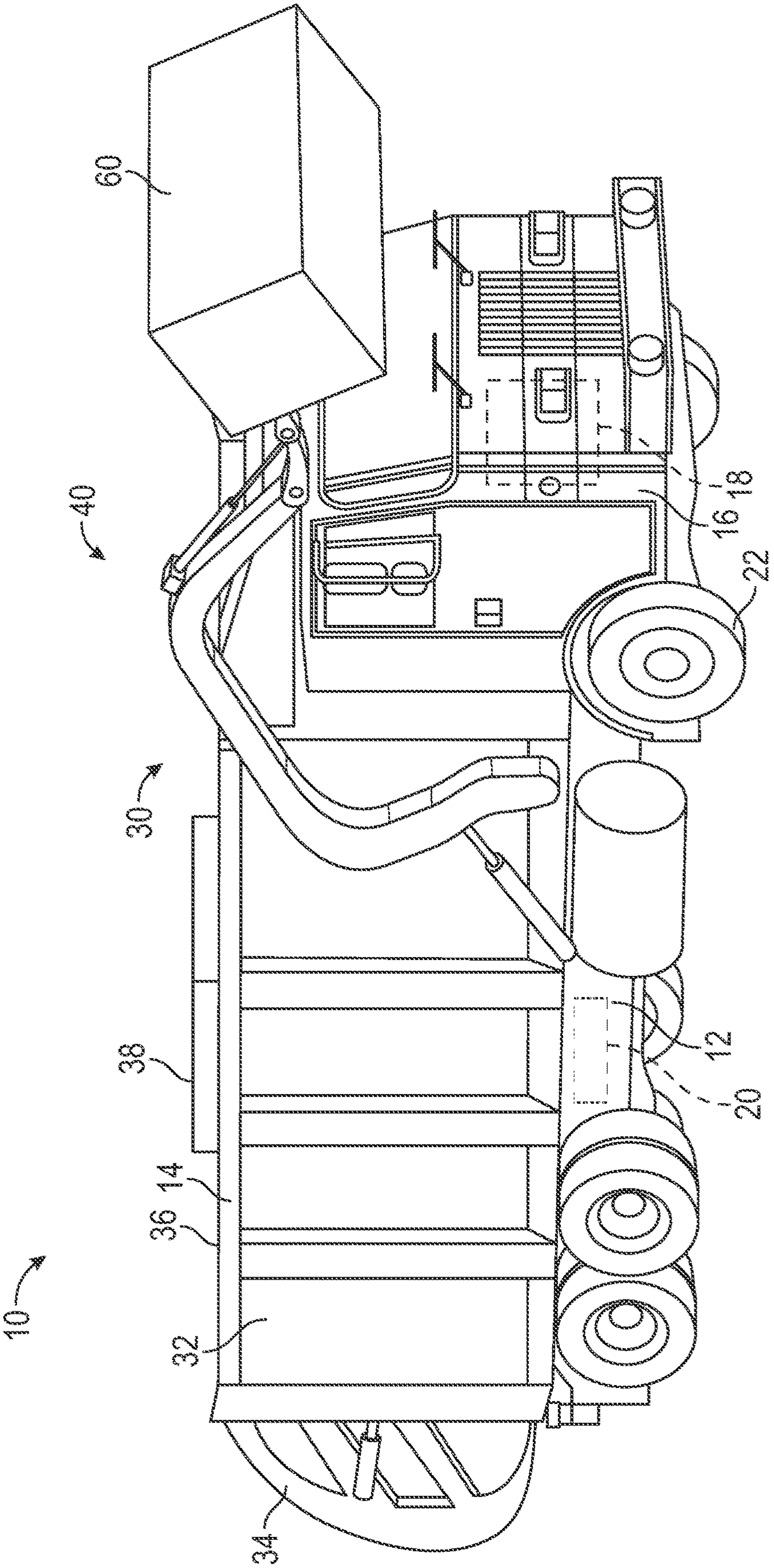
FIG. 1 is a perspective view of a refuse vehicle, according to an exemplary embodiment.
Figure 2:
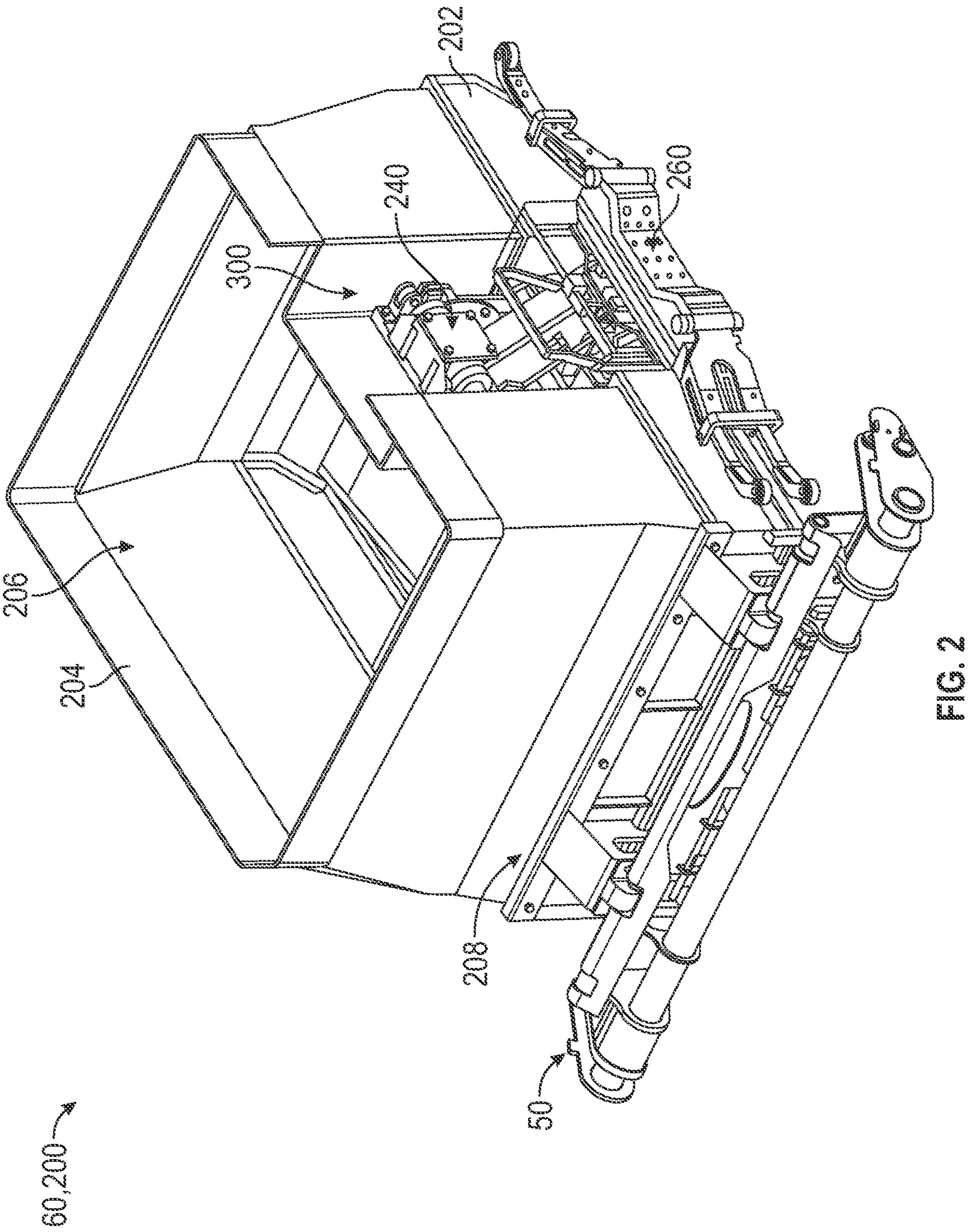
FIG. 2 is a perspective view of a carry can for the refuse vehicle of FIG. 1 having a robotic arm, according to an exemplary embodiment.
Figure 3:
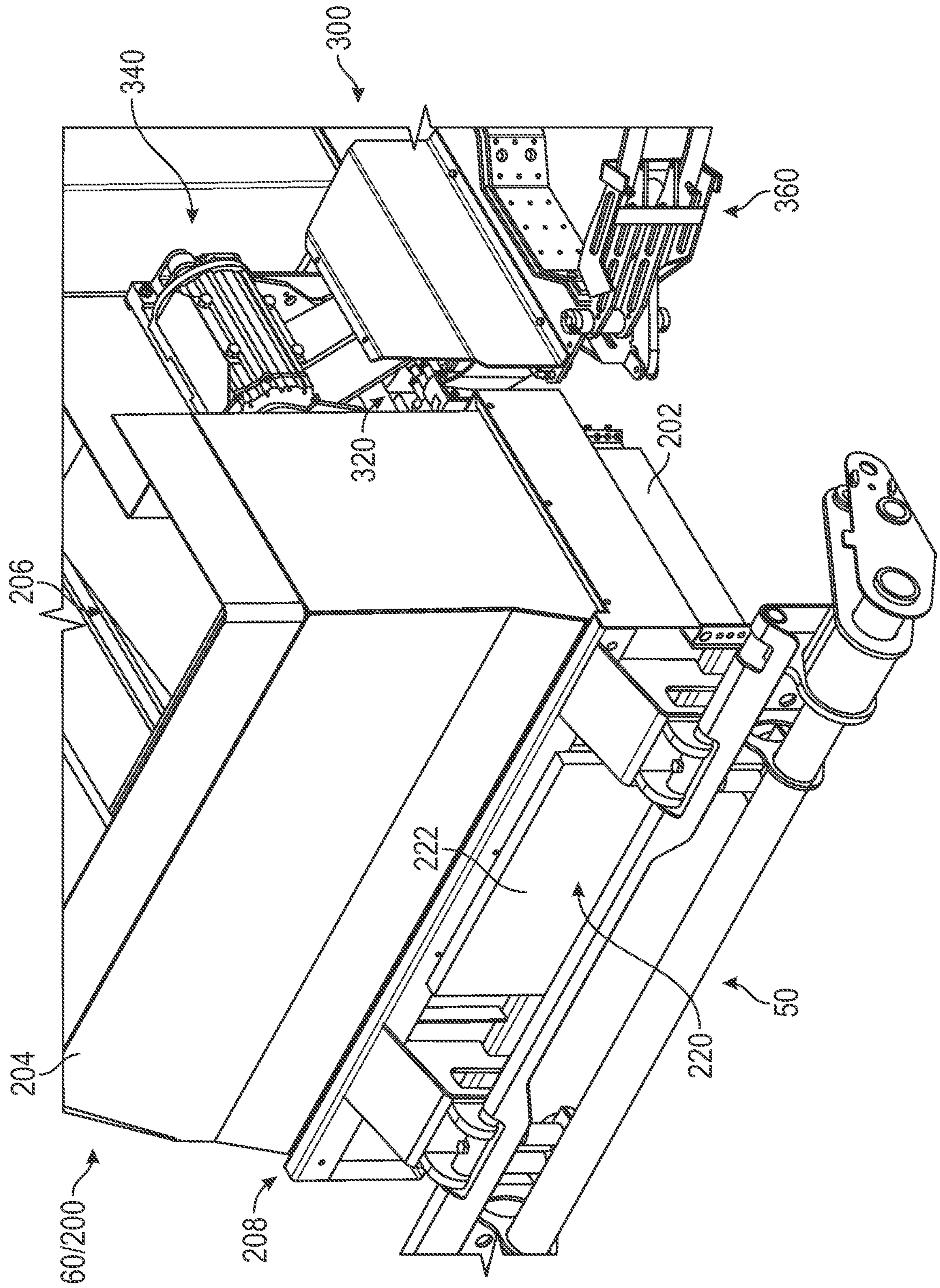
FIG. 3 is a perspective view of the carry can of FIG. 2 having a second energy storage system, according to an exemplary embodiment.
Figure 4:
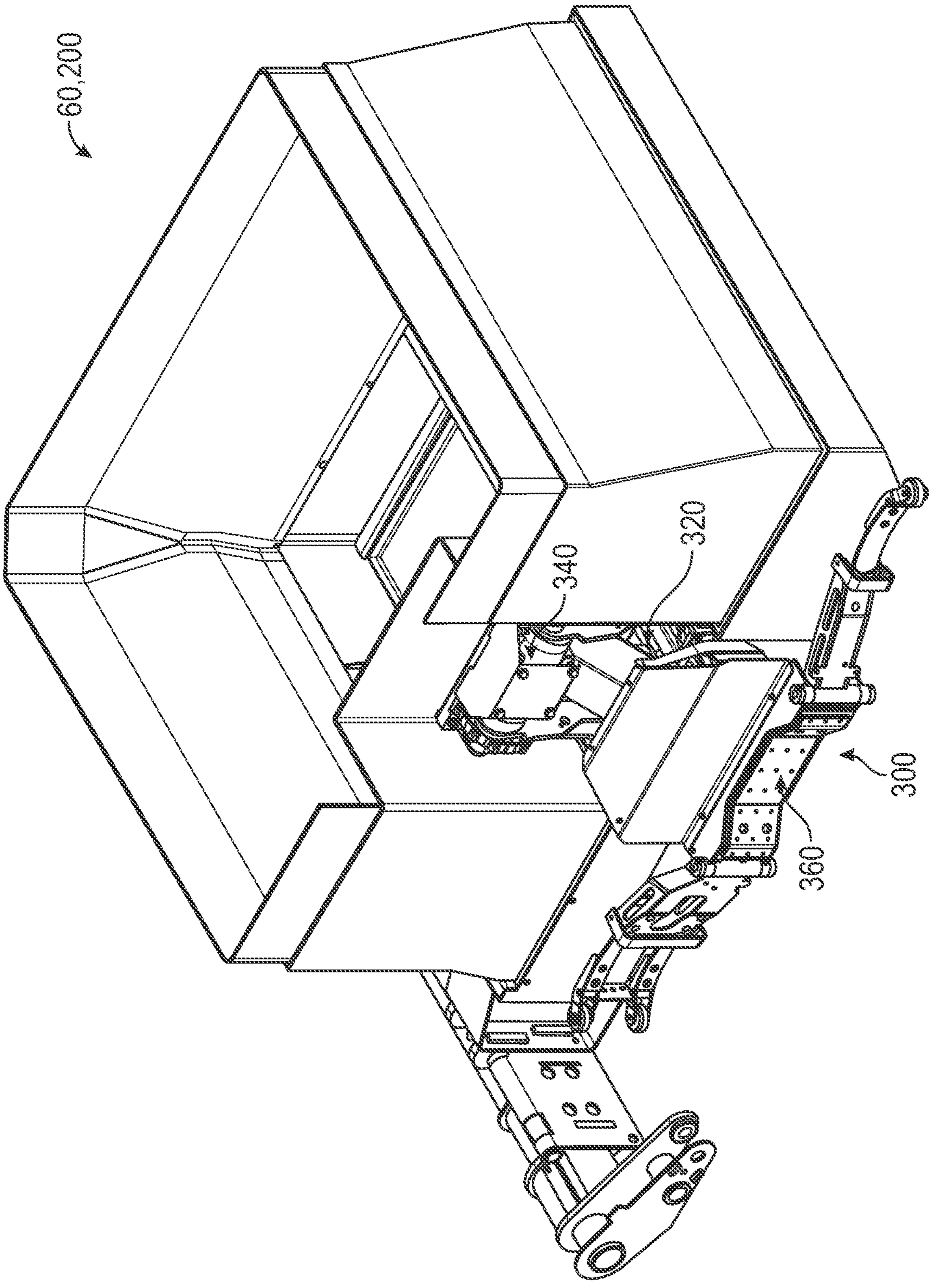
FIG. 4 is a front perspective view of the carry can of FIG. 2 with a can arm in a retracted position.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.). In some embodiments, body 14 acts as the chassis and replaces frame 12, providing structural support to refuse vehicle 10 as a stressed member.

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. The refuse vehicle 10 can include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle using power provided by the prime mover. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber, shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.). In some embodiments, the refuse vehicle 10 includes a vehicle control system, shown in FIG. 6 for controlling and operating the various movable actuators, motors, assemblies, systems, and subsystems of refuse vehicle 10.

Carry Can

According to the exemplary embodiment shown in FIGS. 2-5, the refuse container 60 is configured as a carry can, shown as carry can 200. In some embodiments, the carry can 200 is configured to interface with the lift assembly 40 (e.g., a front-loading lift assembly, etc.) of the refuse vehicle 10. In some embodiments, the carry can 200 is integrated into and forms part of the body 14 (e.g., forming at least a portion of the 30 in a side-loading configuration or a rear-loading configuration). As shown in FIGS. 2-5, the carry can 200 includes a second energy system, shown as can energy storage and/or generation system 220, and an articulating collection arm, shown as robotic arm 300. In some embodiments, the can energy storage and/or generation system 220 powers the robotic arm 300. In some embodiments, the carry can 200 does not include the can energy storage and/or generation system 220. In such embodiments, the energy storage and/or generation system 220 of the refuse vehicle 10 may power the robotic arm 300 (i.e., the robotic arm 300 receives power from an energy storage system onboard the body 14, rather than an energy system on the carry can 200).

As shown in FIGS. 2-5, the carry can 200 includes a refuse container having a base portion, shown as base 202, and peripheral sidewall, shown as container walls 204, extending from the base 202. The base 202 and the container walls 204 cooperatively define an internal cavity, shown as container refuse compartment 206. As shown in FIGS. 2-5, the carry can 200 includes an interface (e.g., a quick attach interface, etc.), shown as lift assembly interface 208, (i) that is positioned along a rear wall of the base 202 and (ii) that is configured to releasably interface with a coupling assembly, shown as quick attach assembly 50. According to an exemplary embodiment, the quick attach assembly 50 is configured to couple to the lift assembly 40 to facilitate lifting the carry can 200 with the lift assembly 40 to empty contents within the container refuse compartment 206 into the refuse compartment 30 of the refuse vehicle 10. Additional disclosure regarding the lift assembly interface 208 and the quick attach assembly 50 may be found in (i) U.S. Pat. No. 10,035,648, filed May 31, 2017, (ii) U.S. Pat. No. 10,351,340, filed Jul. 27, 2018, (iii) U.S. Pat. No. 10,513,392, filed May 16, 2019, and (iv) U.S. Patent Publication No. 2020/0087063, filed Nov. 21, 2019, all of which are incorporated herein by reference in their entireties. In other embodiments, the base 202 and/or the container walls 204 define fork pockets that selectively receive and interface with forks of the lift assembly 40 to facilitate coupling the carry can 200 to the lift assembly 40.

As shown in FIGS. 2-5, the robotic arm 300 is positioned along and selectively extends outward from a sidewall of the container walls 204 of the carry can 200. In other embodiments, at least a portion of the robotic arm 300 is coupled to and translates along a rear wall of the container walls 204 of the carry can 200. As shown in FIGS. 2-5, the robotic arm 300 includes a first assembly, shown as extension mechanism 320; a second assembly, shown as lift mechanism 340, coupled to the extension mechanism 320; and a third assembly, shown as grabber mechanism 360, coupled to the lift mechanism 340.

Figure 5:
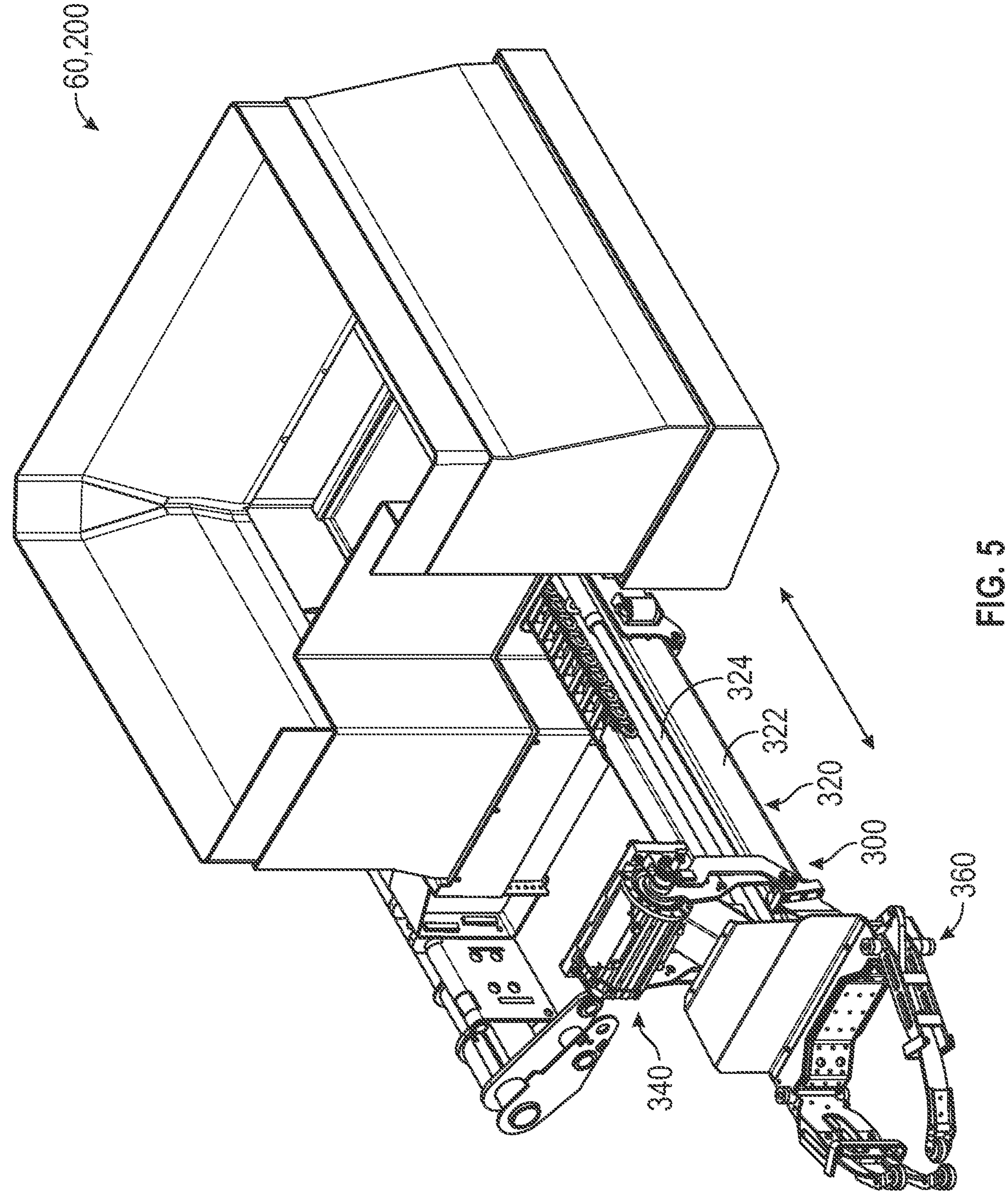
FIG. 5 is a front perspective view of the carry can of FIG. 2 with a can arm in an extended position.

The extension mechanism 320 includes an extendable/telescoping arm, shown as can arm 322, and a first actuator, shown as extension actuator 324, positioned to facilitate selectively extending and retracting the can arm 322 and, thereby, the lift mechanism 340 and the grabber mechanism 360 between a nominal, non-extended position (see, e.g., FIG. 4) and an extended position (see, e.g., FIG. 5). According to an exemplary embodiment, the extension actuator 324 is an electric actuator configured to be powered via electricity provided by the energy storage and/or generation system 20, the carry can energy storage and/or generation system 220, and/or another electrical source on the refuse vehicle 10 and/or the carry can 200 (e.g., a generator, solar panels, etc.). In an alternative embodiment, the extension actuator 324 is a fluidly operated actuator (e.g., a hydraulic cylinder, a pneumatic cylinder, etc.) operated by a fluid pump (e.g., a hydraulic pump, a pneumatic pump, etc.) driven by an electric motor (e.g., the electric motor 18, the secondary electric motor, an integrated motor of the fluid pump, etc.). In such an embodiment, the fluid pump may be positioned on the refuse vehicle 10 or on the carry can 200, and fluidly coupled to the extension actuator 324 via conduits.

ADAS Control Diagram

Figure 6:
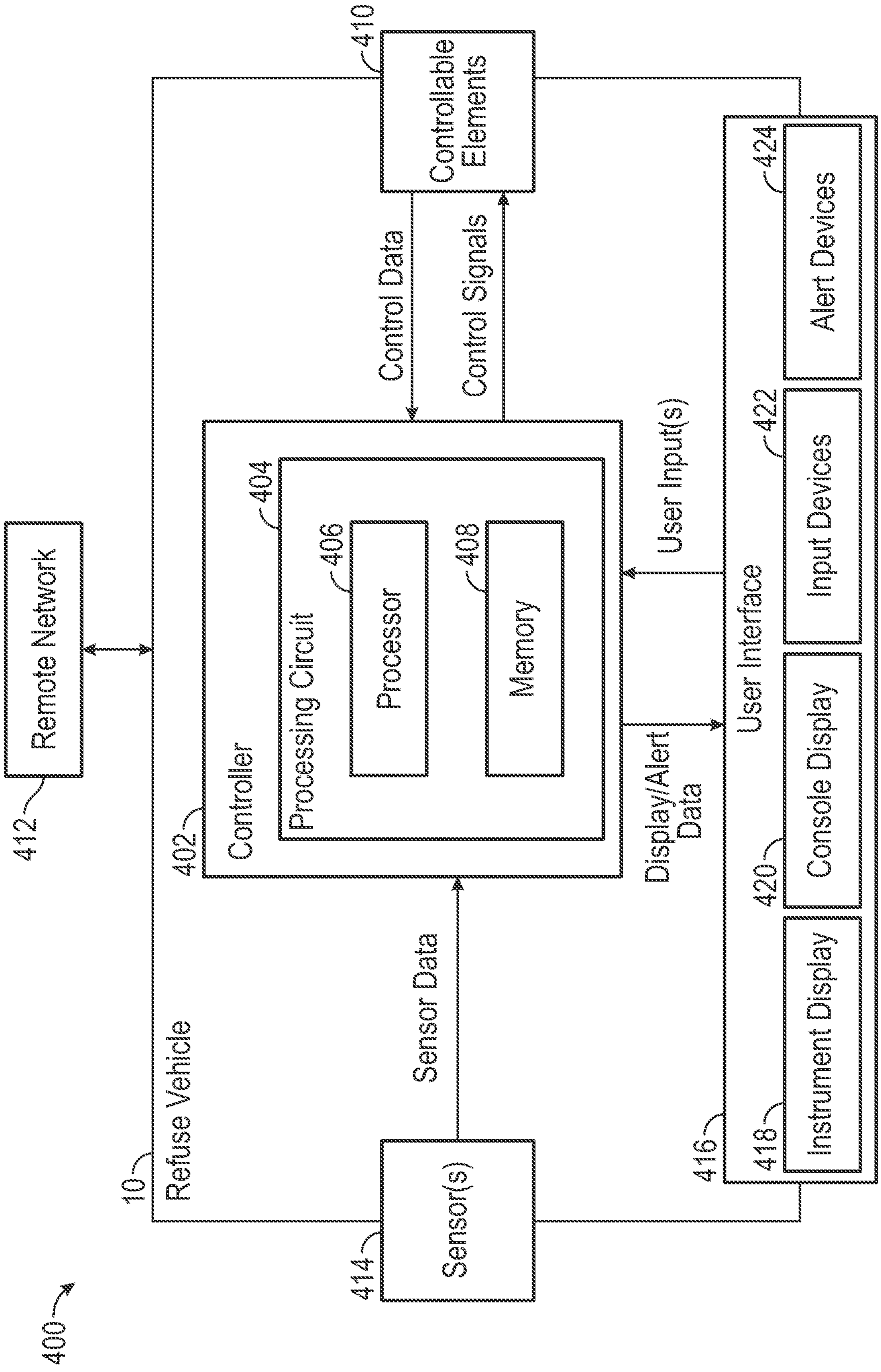
FIG. 6 is a schematic illustration of an advanced driver-assistance system for the refuse vehicle of FIG. 1.

Referring generally to FIG. 6, an advanced driver-assistance system (ADAS), shown as ADAS 400, may be configured to assist an operator of the refuse vehicle 10 and/or provide automatic control of the refuse vehicle 10. For example, the ADAS 400 can provide alerts and/or automatic assistance including lane keeping, lane departure awareness, blind spot awareness, obstacle/pedestrian awareness and avoidance, trip awareness (i.e. traffic sign recognition, traffic signal recognition, etc.), automatic steering and control, automatic speed control, emergency braking, etc. The ADAS 400 may be configured to generate alerts and/or automatic action(s) for the refuse vehicle 10 and/or controllable elements 410 of the refuse vehicle 10, including the various apparatuses, sub-assemblies, sub-apparatuses, systems, devices, etc., of the refuse vehicle 10 based in part on sensor data from sensors 414, control data from the controllable elements 410, and user inputs from a user interface 416.

According to an exemplary embodiment shown in FIG. 6, the ADAS 400 includes a controller 402, one or more controllable elements 410 of refuse vehicle 10 (e.g., electric motors, lift assemblies, pneumatic cylinders, hydraulic cylinders, engines, valves, actuators, linear electric actuators, steering components, power and drive components, etc.), a remote network 412, one or more sensors 414, and a user interface 416. The controller 402 may be one of one or more controllers of the refuse vehicle 10.

According to an exemplary embodiment, the controller 402 includes a processing circuit 404, a processor 406, and memory 408. The processing circuit 404 can be communicably connected to a communications interface such that the processing circuit 404 and the various components thereof can send and receive data via the communications interface. The processor 406 can be implemented as a general purpose processor, an application specific integrated circuit (ASIC), one or more field programmable gate arrays (FPGAs), a group of processing components, or other suitable electronic processing components.

According to an exemplary embodiment, the memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 408 can be or include volatile memory or non-volatile memory. The memory 408 can include database components, object code components, script components, or any other type of information structure for supporting the various activities and information structures described in the present application. According to some embodiments, the memory 408 is communicably connected to the processor 406 via the processing circuit 404 and includes computer code for executing (e.g., by the processing circuit 404 and/or the processor 406) one or more processes described herein.

According to an exemplary embodiment, the controllable elements 410 include steering components, suspension components, power transmission or drive components, braking components, actuators, assemblies, systems, subsystems, and/or accessories of the refuse vehicle 10 that can be controlled by an operator. For example, the controllable elements 410 can include the lift assembly 40. Control data may include the position, speed, status, etc. of the controllable elements 410. For example, the control data may indicate that the lift assembly 40 is positioned in a collection position in front of the cab 16 of the refuse vehicle 10. In some embodiments, the controller 402 facilitates control of the controllable elements 410 by providing control signals based on sensor data, control data, and/or user inputs. In some embodiments, the controllable elements 410 provide control data to the controller 402.

According to an exemplary embodiment, the ADAS 400 can include the remote network 412 with which the controller 402 is configured to communicate. In some embodiments, the controller 402 is configured to wirelessly communicate with the remote network 412. In some embodiments, any user inputs, sensor data, display data, control signals, control data, etc., as obtained, determined, generated, output, etc., by the controller 402 are provided to the remote network 412. In some embodiments, the remote network 412 includes a processing circuit or processing circuitry similar to the processing circuit 404 of the controller 402 so that the remote network 412 can be configured to perform any of the functionality (e.g., the driver-assistance functions) of the controller 402. In this way, the functionality of the controller 402 as described herein may be performed locally at the controller 402 of the refuse vehicle 10, remotely by the remote network 412, or distributed across the controller 402 and the remote network 412 so that some of the functionality as described herein is performed locally at the refuse vehicle 10 while other of the functionality as described herein is performed remotely at the remote network 412.

According to an exemplary embodiment, the ADAS 400 includes one or more sensors, shown as sensors 414. The sensors 414 may be disposed at various locations around the refuse vehicle 10 to identify obstacles and/or obtain other contextual information useful to the controller 402. The sensors 414 include any one and/or a combination of proximity sensors, infrared sensors, electromagnetic sensors, capacitive sensors, photoelectric sensors, inductive sensors, radar sensors, ultrasonic sensors, Hall Effect sensors, fiber optic sensors, Doppler Effect sensors, magnetic sensors, laser sensors (e.g., LIDAR sensors), sonar, and/or the like. In some embodiments, the sensors 414 include an image capture device such as visible light cameras, full-spectrum cameras, image sensors (e.g., charged-coupled device (CCD), complementary metal oxide semiconductor (CMOS) sensors, etc.), or any other type of suitable object sensor or imaging device. Data captured by the sensors 414 may include, for example, raw image data from one or more cameras (e.g., visible light cameras) and/or proximity data from one or more sensors (e.g., LIDAR, radar, etc.) that may be used to detect objects. In some embodiments, the sensors 414 are active during operation of the refuse vehicle 10. Additionally or alternatively, the sensors 414 may become active in response to a detected operation mode of the refuse vehicle 10. For example, a hopper camera may activate in response to the refuse vehicle 10 being put into a collection mode.

In some embodiments, the sensor data is video feed data obtained from the sensors 414 regarding one or more areas in and/or surrounding refuse vehicle 10. For example, the sensor data may be or include video feed data (e.g., live or real-time video feed data) of the front, sides, rear, and/or interior of the refuse compartment 30 of the refuse vehicle 10. In some embodiments, the sensors 414 provide the controller 402 video feed data for generating a 360-degree composite view of the refuse vehicle 10 and/or its surroundings. The 360 composite video feed can be an image of the refuse vehicle 10 from above with the video feeds from one or more cameras, such as cameras 510 and the controller 402 can be configured to stitch together the video feed data from one or more cameras to create the 360-degree composite video feed. In some embodiments, the sensors 414 are radar sensors and the sensor data is proximity data. For example, the sensor data may include proximity data indicating the position, speed, direction of travel, and/or acceleration of one or more objects surrounding the refuse vehicle 10. In some embodiments, the sensors 414 include both cameras and radar sensors and provide both video feed data and proximity data. In some embodiments, the sensor data also includes thermal imaging data from one or more sensors 414. For example, sensor data from a visible light sensor and sensor data from a thermal imaging sensor in hopper camera 522 can be sent to the controller 402 as part of the sensor data.

Referring still to FIG. 6, the ADAS 400 includes the user interface 416. The user interface 416 can be a human machine interface (HMI) that includes various displays and user input devices 422 (e.g., buttons, switches, levers, dials, joysticks, touchpad, touchscreen, etc.), for operation of the refuse vehicle 10. As shown in FIG. 6, the user interface 416 includes displays, shown as an instrument display 418 and a console display 420, input devices 422, and alert devices 424. In some embodiments, the displays such as instrument display 418 and console display 420 are also input devices, such as touchscreens, and are able to receive user inputs in addition to the input devices 422. In some embodiments, the user interface 416 is positioned within the cab 16 of the refuse vehicle 10. In some embodiments, the user interface 416 is configured to obtain user inputs from input devices 422 and provide the user inputs to controller 402. The user inputs can indicate a desired operation and/or operational state of the refuse vehicle 10 or of an apparatus, system, device, sub-system, assembly, etc., of the refuse vehicle 10. For example, the user inputs can indicate a requested operation of the lift assembly 40 and/or the grabber assembly 42. Alternatively or additionally, the user inputs may be conventional steering and control inputs such as steering commands and/or speed commands. The controller 402 may respond to the user inputs by automatically adjusting the information provided to the user by providing the user interface 416 with display data, initiating an automatic alert via the user interface 416 via alert devices 424, and/or initiating an automatic action.

In some embodiments, the alert devices 424 can provide auditory alerts to an operator of the refuse vehicle 10. The alert devices 424 may include speakers, sound output devices, alarms, buzzers, etc. based on the display/alert data provided by the controller 402. In some embodiments, the alert devices 424 are associated with a corresponding automatic action undertaken by the ADAS 400. For example, audible natural language based alerts indicating a lane change can accompany a corresponding automatic lane change initiated the ADAS 400. The audible natural language based alerts can accord to one or more languages.

Figure 7:
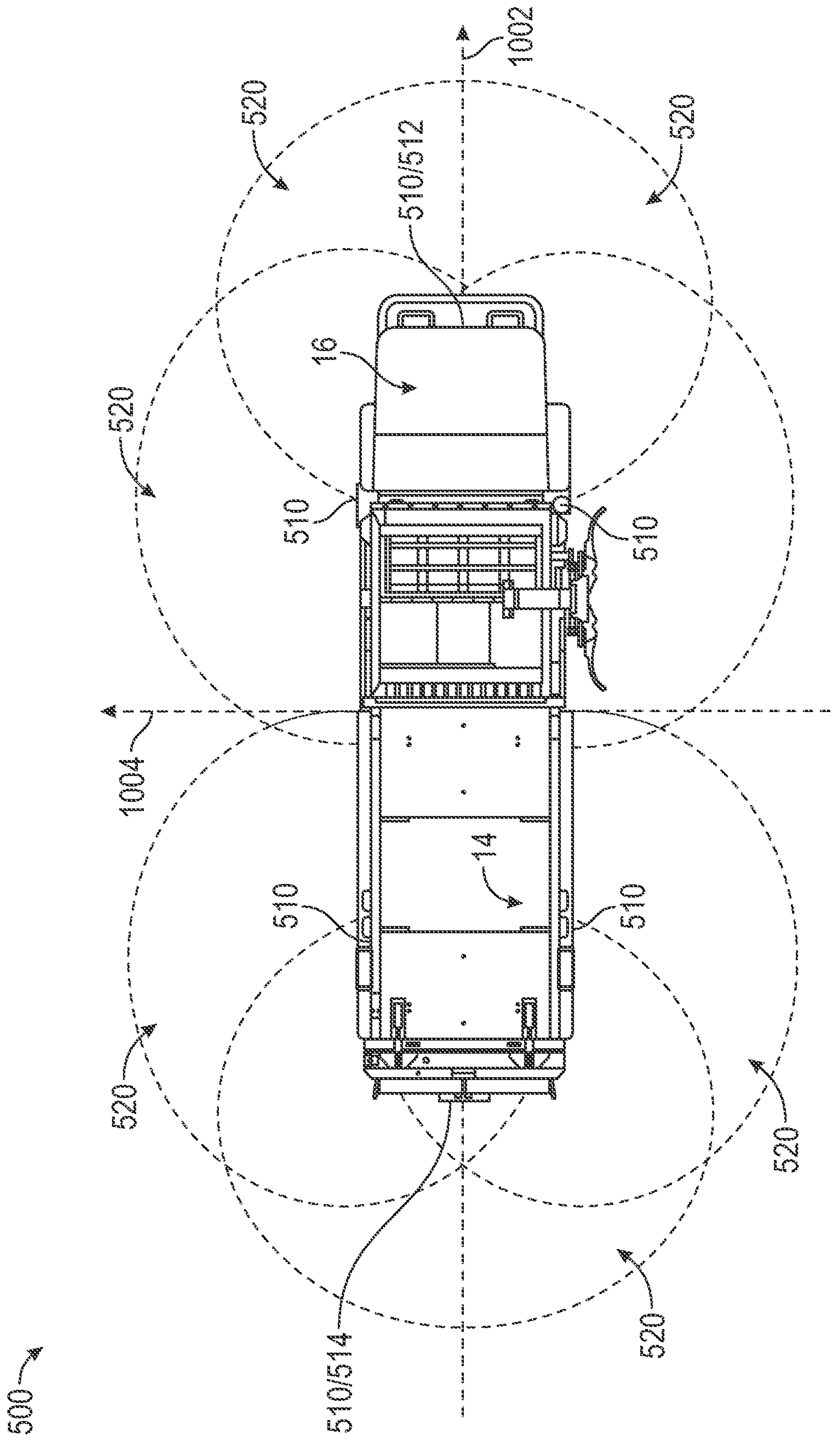
FIG. 7 is a top view of the refuse vehicle of FIG. 1 equipped with the advanced driver-assistance system of FIG. 6 and including a camera system, according to an exemplary embodiment.

According to an exemplary embodiment shown in FIG. 7, the ADAS 400 includes a three hundred and sixty degree (360) camera system, shown as camera system 500, integrated into refuse vehicle 10. The camera system 500 includes sensors, shown as cameras 510. In some embodiments, the cameras 510 may be image sensors configured to capture live video and image data and provide the sensor data to ADAS 400. In some embodiments, each of the cameras 510 defines a field of view, shown as camera FOV 520. The camera FOV 520 can be between 100-180 degrees (e.g., the horizontal angle of view defined by the camera FOV 520). For example, the cameras 510 can each define a 160 degree FOV. The camera FOV 520 of each of the cameras 510 may overlap with one or two adjacent camera FOVs 520 to aid in stitching the various feeds together to form a composite 360-degree view of refuse vehicle 10. In some embodiments, the cameras 510 make up some and/or all of the sensors 414 that provide sensor data to controller 402. As shown in FIG. 7, the cameras 510 may be integrated into the refuse vehicle 10 itself. For example, the body 14 and/or the cab 16 of the refuse vehicle 10 may be modified such that the cameras 510 are integrated and installed into the body 14 and/or the cab 16 so that the cameras 510 are protected and able to obtain appropriate image data. The cameras 510 may be disposed at any number of locations throughout and/or around the refuse vehicle 10. While only six cameras 510 are shown in FIG. 7, it should be understood that the number and position of cameras 510 in the camera system 500 might vary without departing from the scope of the present invention. In some embodiments, cameras 510 include a front camera 512 and a rear camera 514 as part of the camera system 500.

Refuse vehicle 10 is shown on a vehicle axis system with an x-axis 1002 and y-axis 1004 that follow the International Organization for Standardization (ISO) Road Vehicles—Vehicle Dynamics and road-holding ability—Vocabulary (ISO Standard No. 8855:2011) Vehicle Axis System 2.10 convention, published December 2012, the entirety of which is herein incorporated by reference. The x-axis 1002 is a horizontal axis parallel to the vehicle's heading and in the forward direction of the vehicle such that it is also parallel to refuse vehicle 10's longitudinal plane of symmetry. The y-axis 1004 is perpendicular to the x-axis 1002 and the refuse vehicle 10's longitudinal plane of symmetry and is in the left direction of the vehicle of refuse vehicle 10. The z-axis 1006 (shown in FIG. 10) is perpendicular to both the x-axis 1002 and the y-axis 1004 and is pointing upwards. In some embodiments, the front camera 512 and the rear camera 514 are approximately positioned on the x-axis 1002 and at approximately the same height from the ground as the other cameras 512 such that the cameras all lie in the approximately same z-plane parallel to and above the x-y plane.

Figure 8:
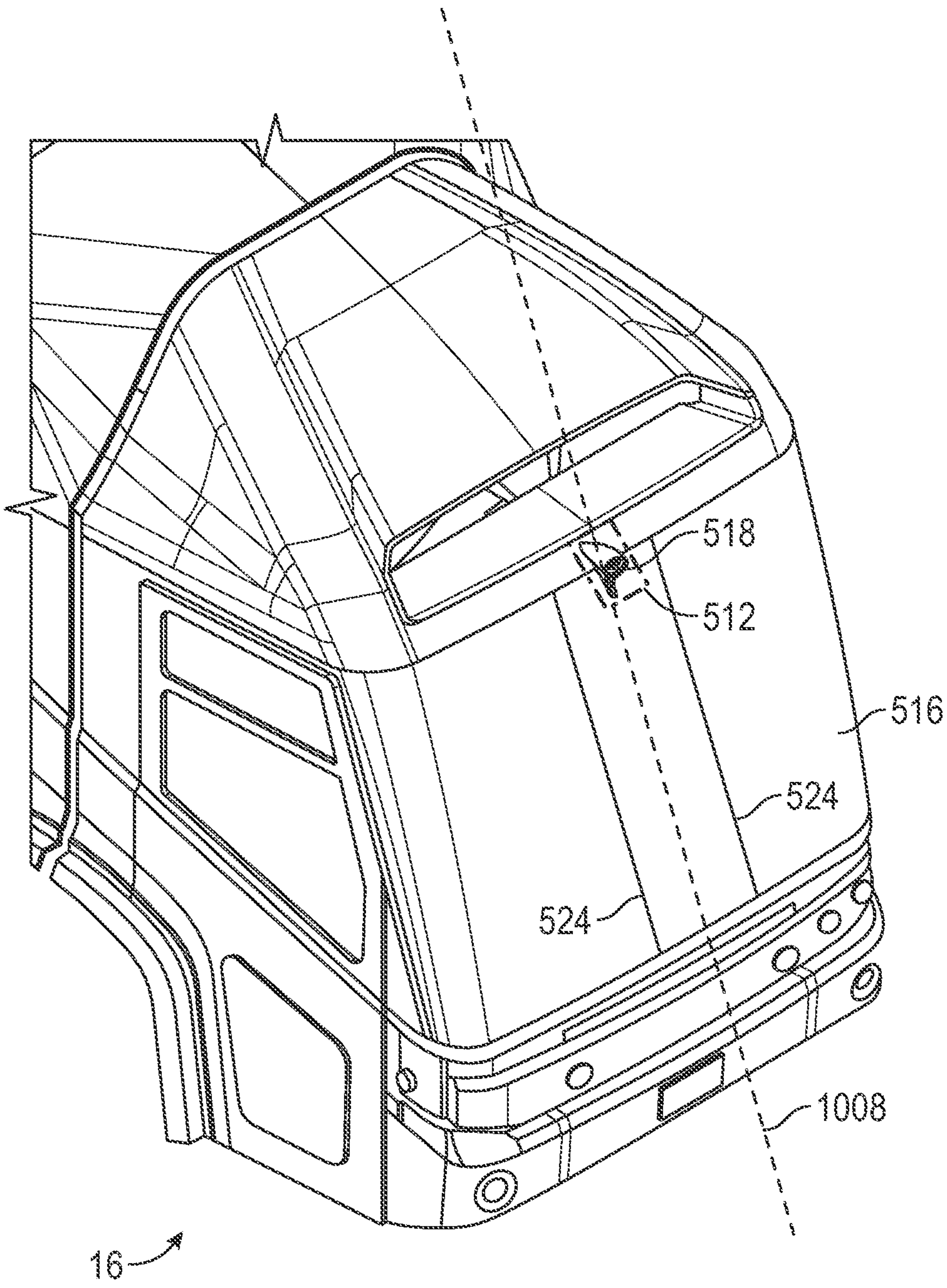
FIG. 8 is a perspective view of a cab of the refuse vehicle of FIG. 7.
Figure 9:
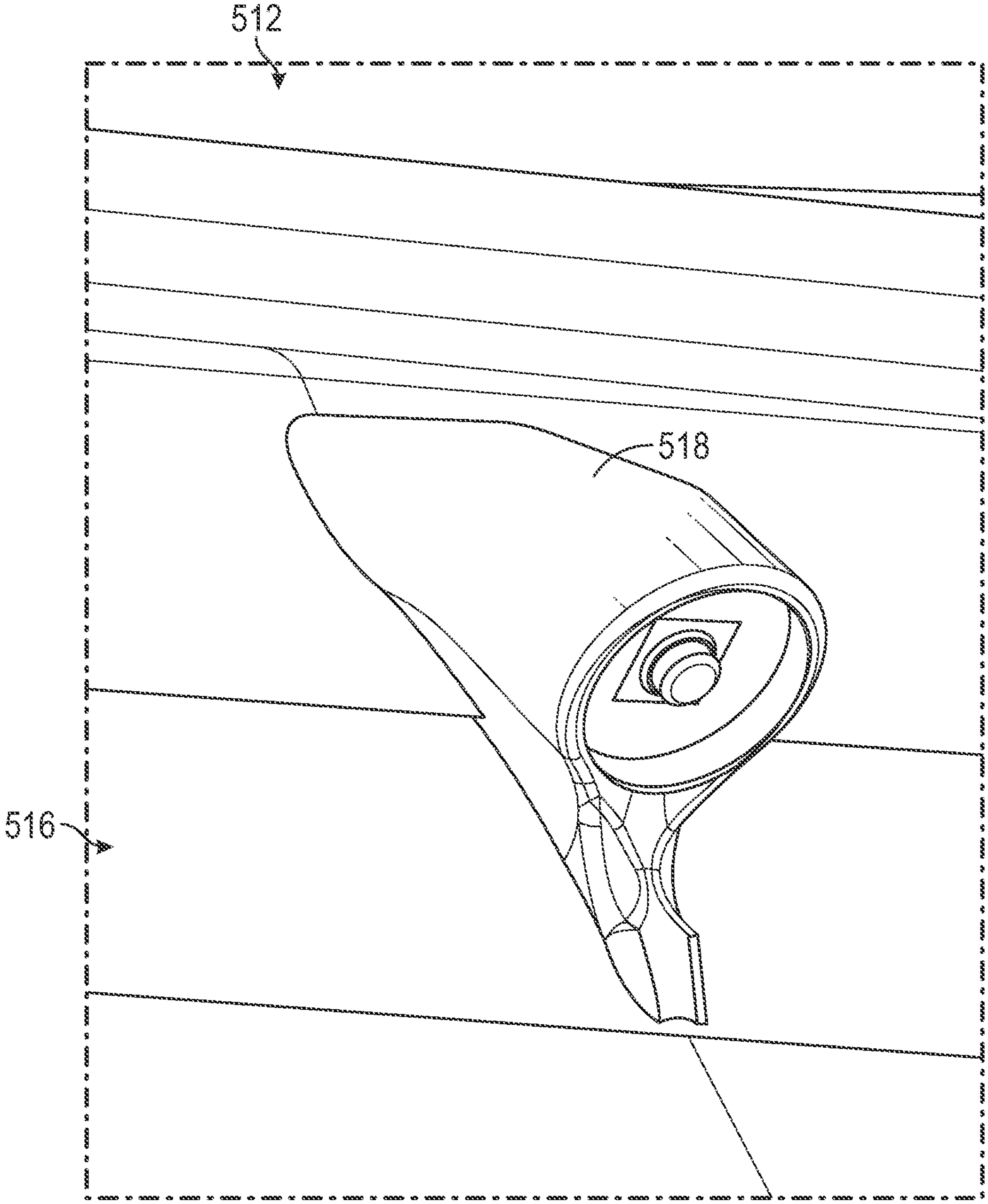
FIG. 9 is an enlarged view a front camera on the cab of FIGS. 8, according to an exemplary embodiment.

Referring now to FIGS. 8-9, the front camera 512 of the camera system 500 may be coupled to cab 16 and integrated into an aerodynamic cowl 518 for maximum airflow and to reduce the impact of airflow going into cores of the cowl 518. In some embodiments, the front camera 512 is positioned above a windshield 516 of cab 16 on approximately a longitudinal centerline 1008 of refuse vehicle 10 that is parallel with x-axis 1002 shown in FIGS. 7 and 10. In some embodiments, windshield protection bars 524 are placed on either side of the front camera 512. The windshield protection bars 524 may interfere with the image data obtained from front camera 512 if placed too close to front camera 512. To minimize interference of the windshield protection bars 524 on the front camera 512, the windshield protection bars 524 can be placed laterally offset from the longitudinal centerline 1008 of the refuse vehicle 10 and above the windshield 516. For example, the windshield protection bars 524 can be placed approximately 8 inches laterally offset from the longitudinal centerline 1008 of the refuse vehicle 10 and extend approximately 3 inches above windshield 516. In some embodiments, the windshield protection bars 524 are placed between approximately 1-12 inches offset from the longitudinal centerline 1008 of refuse vehicle 10 and extend approximately 1-12 inches above the windshield 516. In some embodiments, the cowl 518 may include a secondary cover material for improving airflow in the cores of the front camera 512 and reducing the risk of collisions that may damage the front camera 512.

Figure 10:
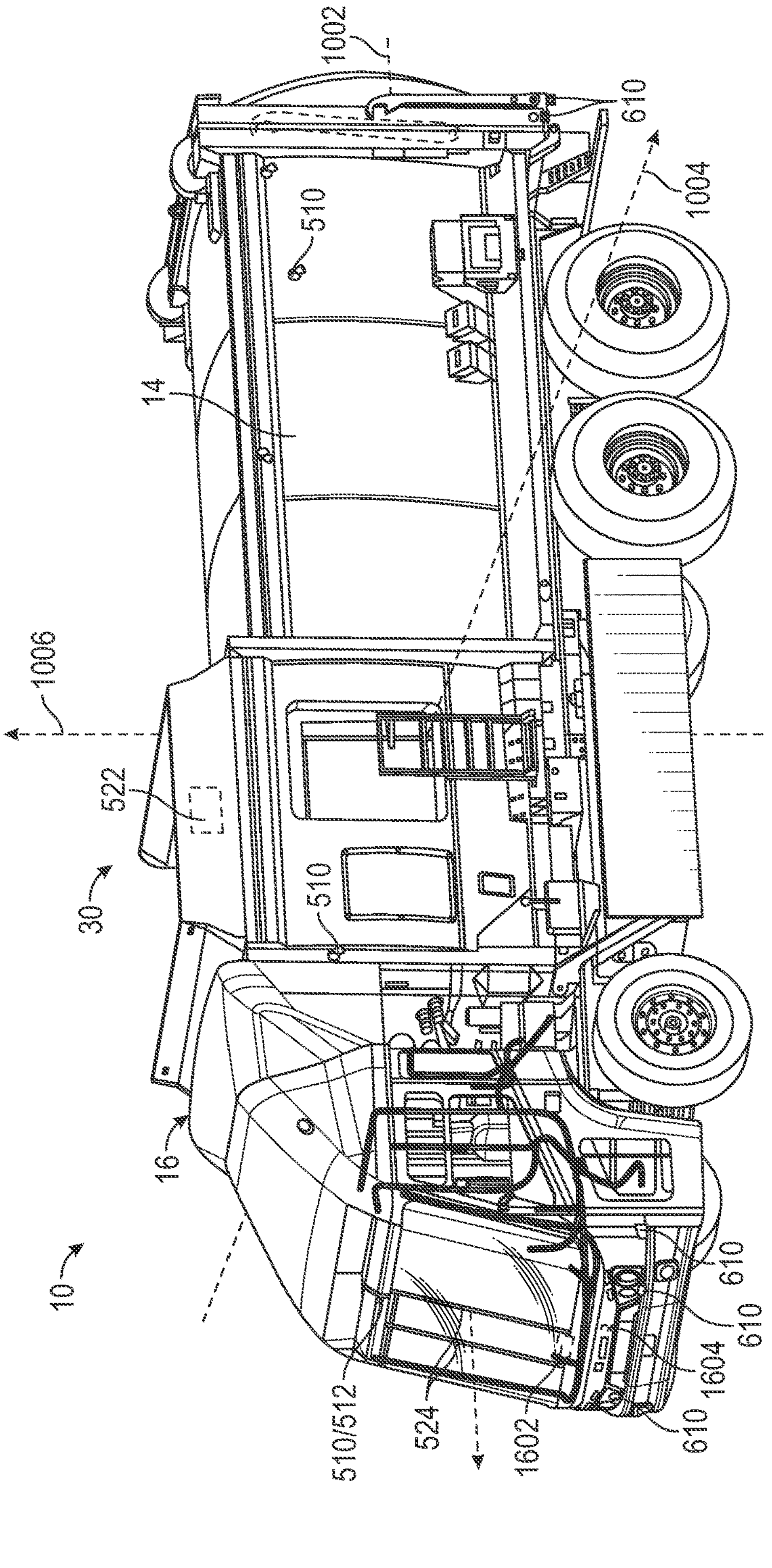
FIG. 10 is perspective view of the refuse vehicle of FIG. 7, according to an exemplary embodiment.

According to an exemplary embodiment shown in FIG. 10, the cameras 510 of the camera system 500 are integrated directly into the structure of the refuse vehicle 10. For example, the cameras 510 are integrated into and mounted on the body 14 and the cab 16 of the refuse vehicle 10. In some embodiments, the cameras 510 are positioned according to one or more criteria to ensure image data from the cameras 510 can be combined to create a 360-degree composite view of the refuse vehicle 10 and its surroundings. The criteria can include angle, height, position relative to other cameras 510 in the camera system 500, position on the refuse vehicle 10, etc. For example, the cameras 510 integrated can have a 60 degree downward angle (i.e., a centerline extending through a body of the cameras 510 may intersect with a ground plane at a 60 degree angle), and be positioned at approximately the same height along the z-axis 1006 as measured from ground level and in an approximately horizontal plane that is parallel to the x-y plane (i.e., in the same z-plane). The height of the cameras 510 is approximately equal to ensure the 360 composite video feed is useable. In some embodiments, the cameras 510 are positioned as high as possible on the refuse vehicle 10 while keeping each of the cameras 510 in the same z-plane (i.e., the highest location on the refuse vehicle 10 where this is mounting area available in the same z-plane on the body 14 and the cab 16 for all the cameras 510). In some embodiments, the cameras 510 may vary from the desired height by plus or minus 12 inches without interfering with the ability of the controller 402 to integrate the feeds from the cameras 510 into a 360-degree composite view.

Still referring to FIG. 10, ADAS 400 is shown to include the position of hopper camera 522 in the refuse compartment 30 of the refuse vehicle 10. In some embodiments, the hopper camera 522 is mounted to an interior surface of the refuse compartment 30. The hopper camera 522 is positioned to view the dumping operation of a refuse container into the refuse compartment 30 to provide an operator a view of the contents of the refuse compartment 30 so the operator can screen refuse as it is collected for contaminants. Contaminants may include any unwanted items or creatures, including garbage in a recycling stream, batteries, live and dead animals, etc.

In some embodiments, to aid in the screening process, the hopper camera 522 can include a thermal imaging sensor (e.g., FLIR) in the place of or in addition to a visible light sensor. The hopper camera 522 with thermal imaging sensors can detect creatures or other objects based on differences in the temperature of the object and its surroundings to improve an operator's ability to screen the contents of the refuse compartment 30. For example, thermal imaging data from the hopper camera 522 can detect that a creature such as a squirrel is within the refuse compartment 30. In other embodiments, the thermal imaging capabilities of the hopper camera 522 are used for confirmation purposes, with vision techniques for processing the image data serving as the initial mode of detection of unwanted objects and/or creatures. In some embodiments, the ADAS 400 is configured to automatically monitor the refuse stream in the refuse compartment 30 using the hopper camera 522. The ADAS 400 can use the normal visible light sensor and/or an additional thermal imaging sensor to automatically detect contaminants in the refuse compartment 30. In some embodiments, upon detecting a contaminant in the refuse compartment 30 based on the data provided by the hopper camera 522, the ADAS 400 can generate one or more control signals and/or alerts. For example, the ADAS 400 can generate a control signal to stop the dumping operation when a contaminant is detected and provide an alert to an operator. The ADAS 400 may be configured to display the image data from either the visible light sensor and/or the thermal imaging sensor in the hopper camera 522 to an operator.

Figure 26:
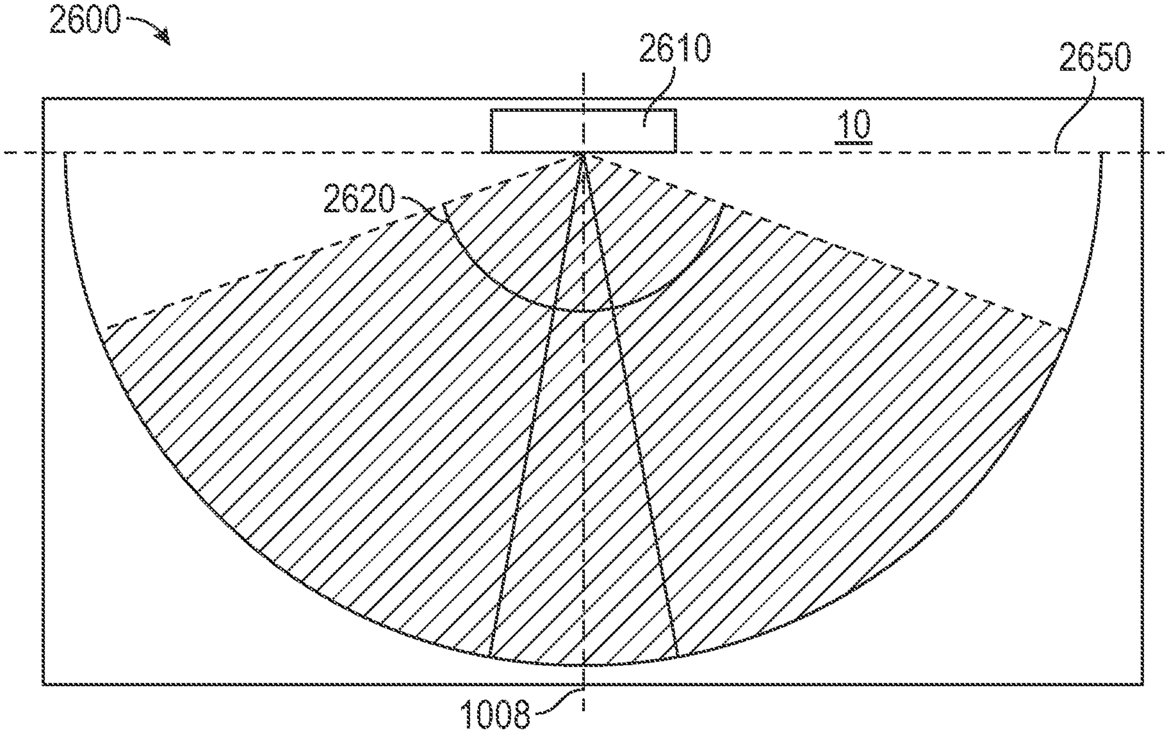
FIG. 26 is a top view of the refuse vehicle of FIG. 1 equipped with the advanced driver-assistance system of FIG. 6 and including an alley camera system, according to an exemplary embodiment.
Figure 27:
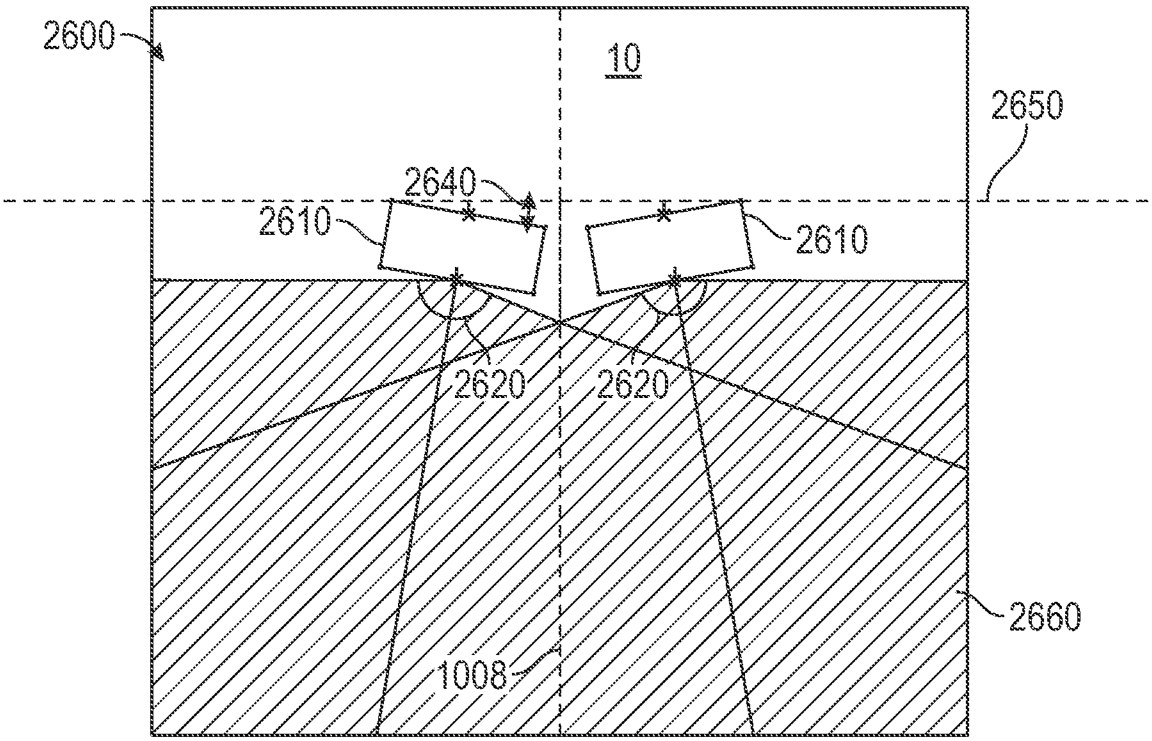
FIG. 27 is a top view of the refuse vehicle of FIG. 1 equipped with the advanced driver-assistance system of FIG. 6 and including an alley camera system having two cameras, according to an exemplary embodiment.

According to an exemplary embodiment shown in FIGS. 26 and 27, the ADAS 400 includes an alley camera system, shown as alley system 2600, configured to provide a wide-angle field of view of the area behind the refuse vehicle 10 (e.g., as the refuse vehicle 10 is reversing from an alleyway). In some embodiments, the alley system 2600 includes one or more alley cameras, shown as alley cameras 2610, positioned at a rear of refuse vehicle 10. The alley cameras 2610 can have a field of view, shown as FOV 2620, between 150 and 170 degrees (e.g., the horizontal angle of view defined by the FOV 2620). In some embodiments, the FOV 2620 is 160 degrees. In some embodiments, two alley cameras 2610 are mounted on opposing sides of the longitudinal centerline 1008 of refuse vehicle 10. To maximize the field of view of the alley system 2600, the alley cameras 2610 can be mounted off-center of longitudinal centerline 1008. For example, a pair of alley cameras 2610 can be mounted approximately 2 inches laterally off center of the longitudinal centerline 1008 (see, e.g., FIG. 27). In some embodiments, the alley cameras 2610 are mounted flush with a horizontal plane 2650 that is perpendicular to longitudinal centerline 1008 which represents the rear of refuse vehicle 10 (see, e.g., FIG. 26). In some embodiments, the alley cameras 2610 can be mounted at an angle 2640 relative to the horizontal plane 2650 (e.g., the rear of the refuse vehicle 10). Mounting the alley cameras 2610 at an angle can allow for the combined video feeds from the alley cameras 2610 to define a 180 degree field of view. For example, the off-center and angled mounting position of the alley cameras 2610 can provide a 180 degree field of view to alley system 2600, shown as an alley system FOV 2660. In some embodiments, the angle 2640 may be approximately 10 degrees relative to the horizontal plane 2650.

In some embodiments, the alley system 2600 is a component of the camera system 500, and the alley cameras 2610 are part of the cameras 510. For example, the alley cameras 2610 may form the rear cameras 514 of the camera system 500. In some embodiments, the alley system 2600 is a separate system and the data from the alley system 2600 is provided to the ADAS 400 in the same manner and for the same purpose as data from the camera system 500. In some embodiments, the data from the alley system 2600 may be separately addressable. For example, the ADAS 400 can be configured to automatically display the combined feed from one or more of the alley cameras 2610 when the ADAS 400 determines the refuse vehicle 10 is in a reverse mode. In some embodiments, the data from the alley system 2600 can be combined with the data from one or more other systems of the ADAS 400 (i.e., the camera system 500, radar system 600, and/or the collision detection system 1600 described herein).

Figure 11:
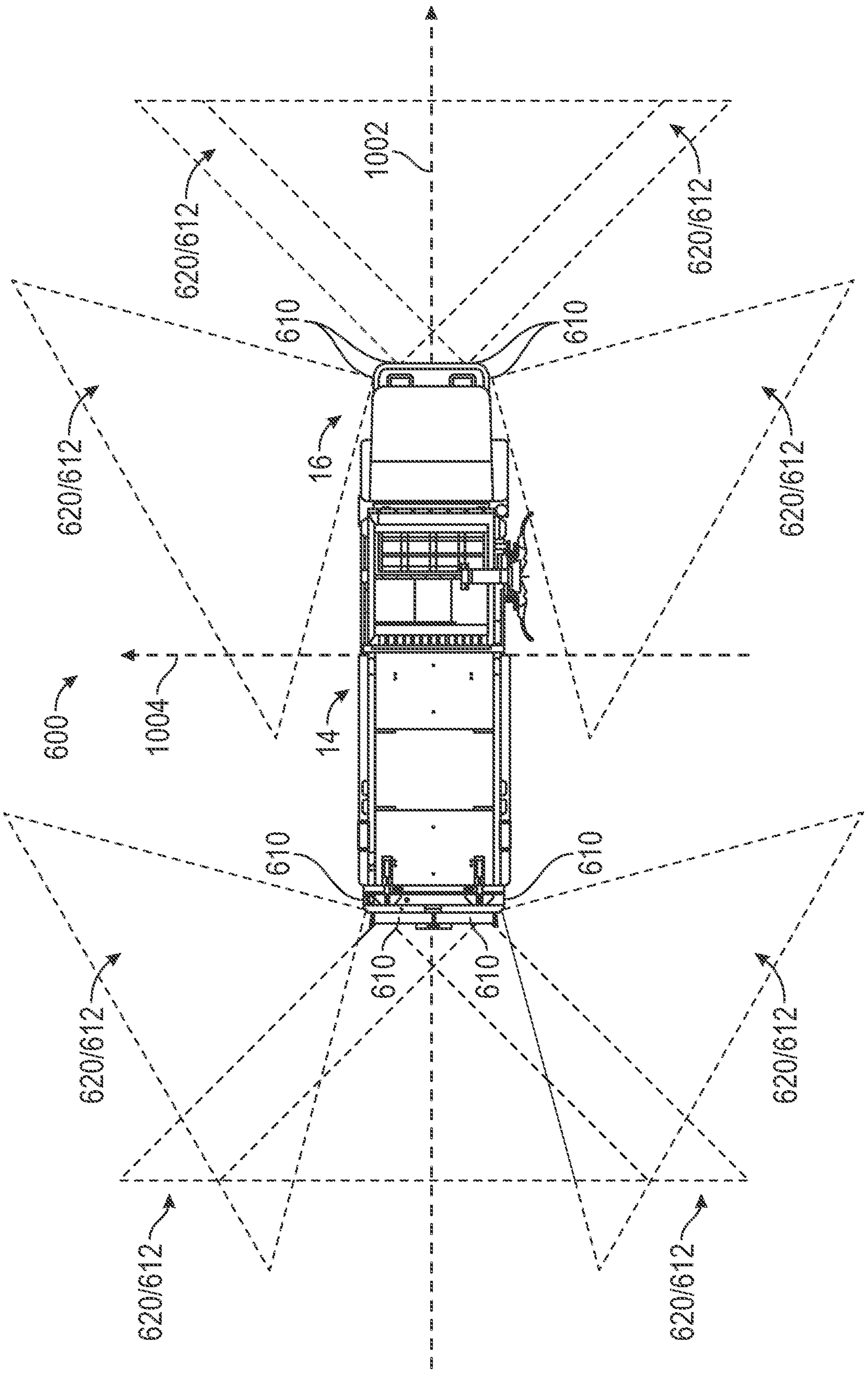
FIG. 11 is a top view of the refuse vehicle of FIG. 1 equipped with the advanced driver-assistance system of FIG. 6 and including a radar detection system, according to an exemplary embodiment.

Turing to FIG. 11, the ADAS 400 includes a radar detection system, shown as radar system 600, configured to detect the position, speed, direction of travel, and/or acceleration of one or more objects external to the refuse vehicle 10. The radar system 600 includes radar sensors, shown as radar sensors 610 integrated into the body 14 and/or the cab 16 of the refuse vehicle 10, with field of views, shown as radar FOVs 620. In some embodiments, the radar sensors 610 make up some and/or all of sensors 414 that provide sensor data to the controller 402. In some embodiments, the radar sensors 610 are dual sensing radar sensors, and may have multiple radar FOVs 620, such as a first FOV for short range sensing, shown in FIG. 11 as short range FOV 612, and a second FOV for long range sensing, shown in FIG. 15 as long range FOV 614. In some embodiments, the short range FOV 612 is wider than the long range FOV 614 (e.g., the horizontal angle of view defined by the short range FOV 612 is greater than the horizontal angle of view defined by the long range FOV 614). For example, the short range FOV 612 can be approximately 45 degrees (e.g., the horizontal angle of view defined by the short range FOV 612) and the long range FOV 614 can be approximately 20 degrees. In some embodiments, the radar sensors 610 are single-distance radar sensors and have only a single FOV. In some embodiments, the radar sensors 610 are installed low to the ground in a substantially horizontal plane parallel to the x-y plane made by the x-axis 1002 and the y-axis 1004. For example, the radar sensors 610 can be placed between approximately 35 and approximately 43 inches off the ground on a horizontal plane. The radar sensors 610 are placed approximately horizontally to ensure proper functionality. Placing the radar sensors 610 low to the ground helps the radar sensors 610 detect smaller vehicles such as motor cycles and smaller pedestrians. In some embodiments, the radar sensors 610 can provide sensor data to the controller 402 of the ADAS 400 that indicates the existence of objects external to the refuse vehicle 10. The objects can include pedestrians, vehicles, refuse containers, etc. In some embodiments, the sensor data includes a position, direction of travel, speed, and/or acceleration of detected obstacles.

According to an exemplary embodiment, the radar system 600 includes two radar sensors 610 positioned on the front of the cab 16 and with the radar FOV 620 directed in a generally forward direction (e.g. a centerline of the radar FOV 620 is generally parallel to the x-axis 1002 or a forward direction of travel of the refuse vehicle 10). In some embodiments, two radar sensors 610 are positioned on the front corners of the cab 16 and positioned so that the radar FOV 620 is directed more toward the rear of refuse vehicle 10. In some embodiments, two radar sensors 610 are integrated into the rear of body 14 and positioned to face a generally rearward direction (e.g., a centerline of the radar FOV 620 is generally parallel to the x-axis and faces a reverse direction of travel of the refuse vehicle 10). In some embodiments, two radar sensors 610 can be integrated into the rear corners of body 14 and positioned at an angle relative to the two radar sensors arranged in the rear of the body 14. For example, the radar sensors 610 arranged in the rear corners of the body 14 may be orientated at an approximately 45 degree angle relative to the radar sensors 610 positioned to in the rear of the body 14. While the radar sensors 610 are shown in the configuration described above, it should be understood that the number and position of the radar sensors 610 in the radar system 600 may vary without department from the scope of the invention. For example, radar system 600 may only include front-facing and rear-facing radar sensors 610, rather than additional sensors in the corners.

Figure 12:
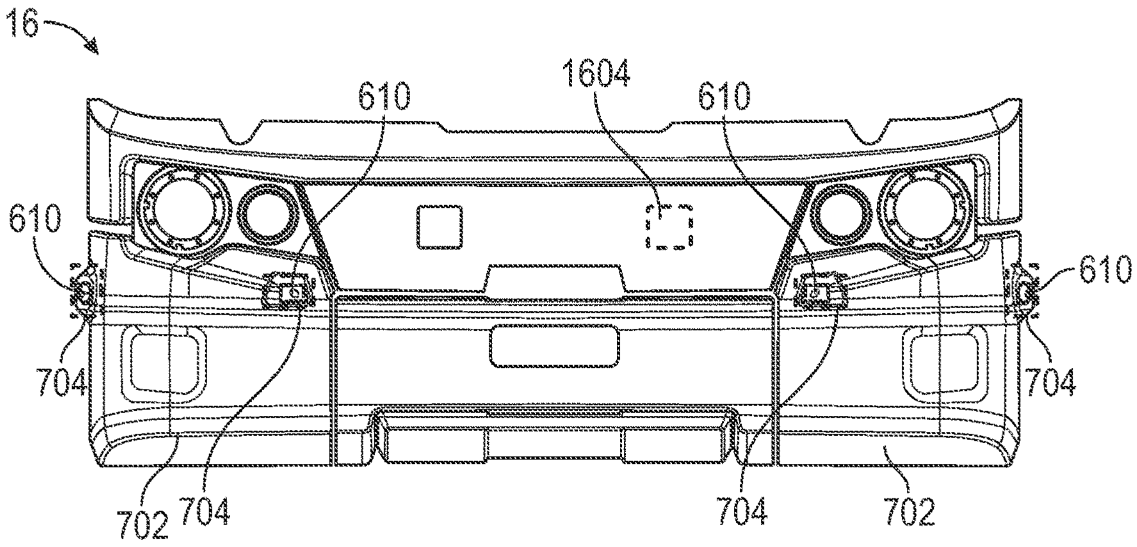
FIG. 12 is a front view of a cab of the refuse vehicle of FIG. 11.
Figure 13:
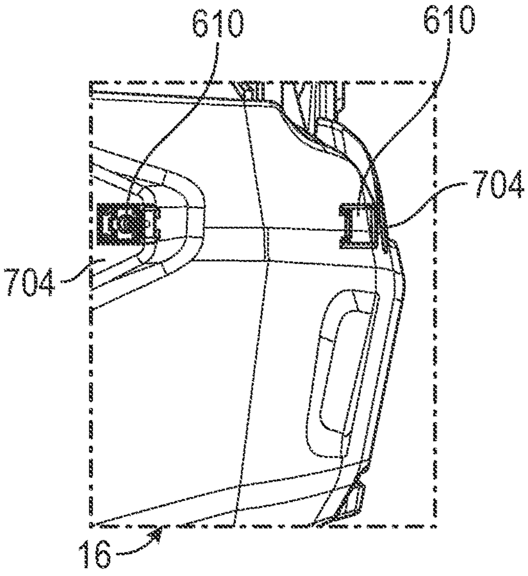
FIG. 13 is a side view of a portion of the cab of FIG. 12.
Figure 14:
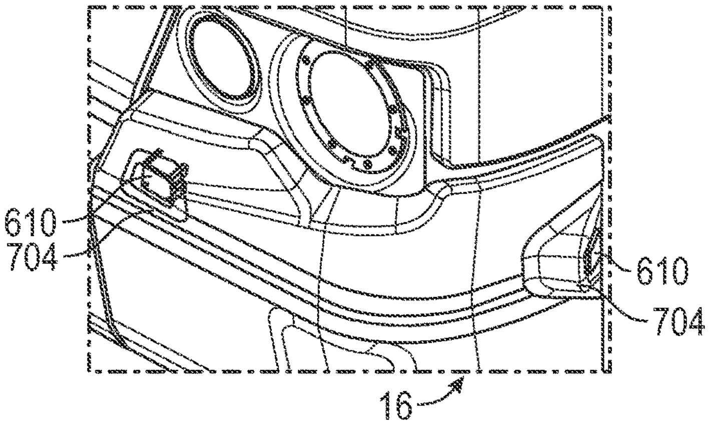
FIG. 14 is a perspective view of a portion of the cab of FIG. 12.

As shown in FIGS. 12-14, the radar sensors 610 can be integrated directly into the structure of refuse vehicle 10. For example, as shown in FIG. 12, the cab 16 may include four radar sensors 610 integrated into cab 16. In some embodiments, the radar sensors 610 are installed behind an exterior of the cab 16, and positioned to sense outward through the exterior. In some embodiments, the cab 16 includes one or more body panels, shown as body panels 702, which make up the exterior of the cab 16. In some embodiments, the body panel 702 may be a composite panel composed of multiple layers of material. For example, the body panels 702 may include a base material that provides structural integrity to the cab 16 and a cover material positioned directly in front of the radar sensors 610, shown as covers 704, which may be made from a material that is transparent to the emission from the radar sensors 610. In some embodiments, the body panels 702 can be fabricated from a composite panel largely constructed from metal, such as aluminum or steel, with the portions of the body panel 702 directly in front of the radar sensors 610, such as the covers 704, being fabricated from radar-transmissive materials (e.g., plastics, non-metallic, polycarbonate material, etc.).

In some embodiments, each of the radar sensors 610 is positioned behind a respective one of the covers 704 and attached to a firewall of the cab 16. The radar sensors 610 can be positioned with a gap between the radar sensors 610 and the cover 704. In some embodiments, the radar sensors 610 must be placed within a maximum distance of any protruding metal feature (e.g., bumper) of cab 16. For example, the radar sensors 610 may be at most one inch behind a protruding metal bumper to minimize interference to the radar sensors 610 due to the metal bumper. As shown in FIGS. 11-14, the cab 16 may include two radar sensors on the front of the cab 16 and two radar sensors on the front corners of the cab 16. In some embodiments, the covers 704, while composed of a different material than the remainder of the body panel 702, are configured to resemble the external appearance of the body panel 702. Further, by being integrated into the cab 16, such as being installed behind a body panel 702 of the cab 16, the radar sensors 610 are protected from hazards such as dirt, water, and/or accidental contact that may move radar sensors 610 out of alignment or damage the radar sensors 610. Proper alignment of radar sensors 610 is important to the overall function of the radar system 600 and integrated sensors can provide a more stable platform.

In some embodiments, the radar sensors 610 may include an external case. The thickness of the external case may be limited to minimize the interference with the radar sensors 610 from external case. For example, the external case may have a maximum thickness of 1.8 mm. In some embodiments, the radar sensors 610 are mounted with a gap between external case and an outer face of radar sensors 610. For example, the radar sensors 610 can be mounted with a 0.5 mm gap between the outer face of the radar sensors 610 and the external case. In some embodiments, the external case is made of plastic e.g., polycarbonate.

Figure 15:
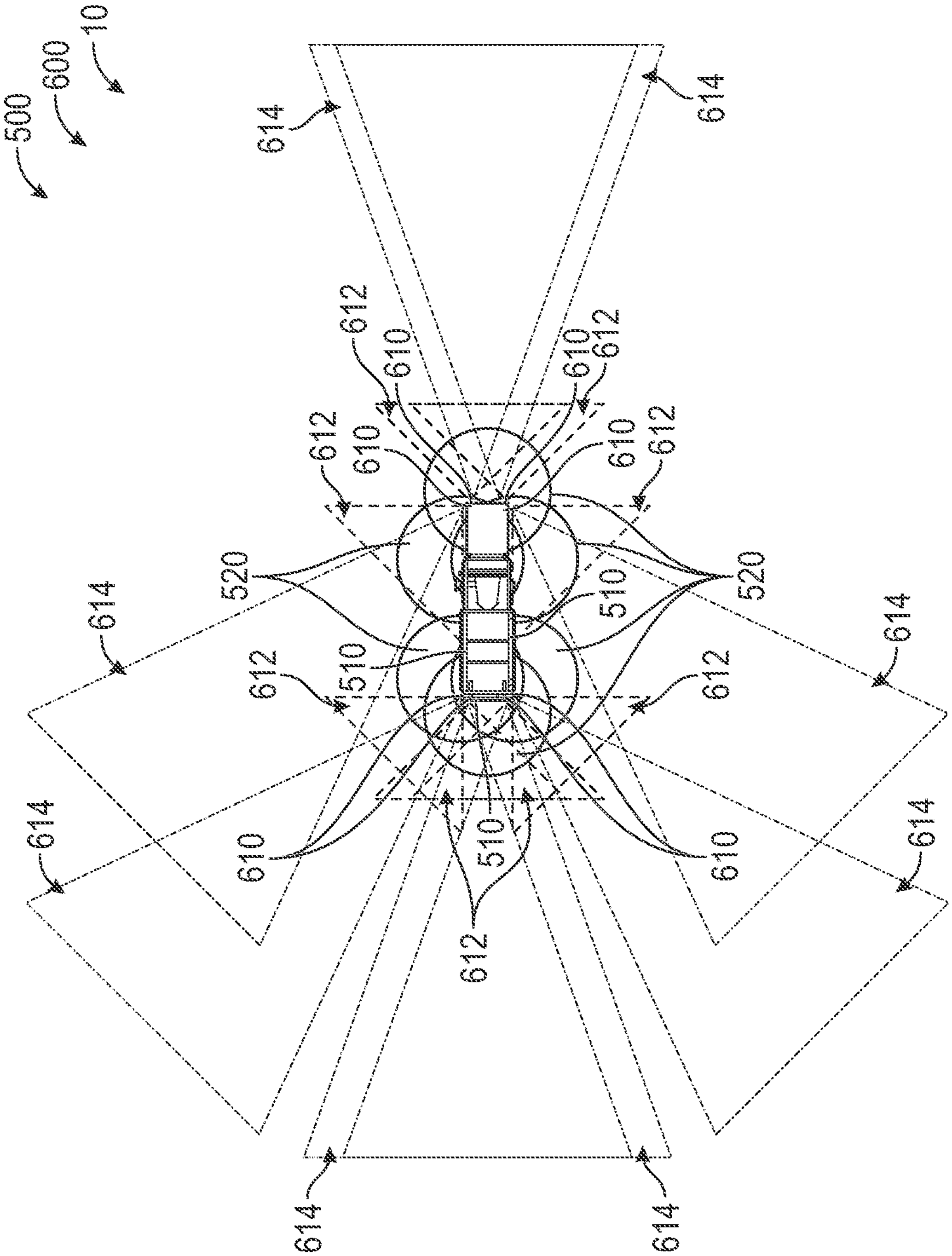
FIG. 15 is a top view of the refuse vehicle of FIG. 1 equipped with the advanced driver-assistance system of FIG. 6 and including a camera system and a radar detection system, according to an exemplary embodiment.

As shown in FIG. 15, refuse vehicle 10 may include both the camera system 500 and the radar system 600. In some embodiments, the controller 402 of the ADAS 400 receives inputs from both the camera system 500 and the radar system 600 and integrates the two inputs into a single composite data model of the refuse vehicle 10 and/or its surroundings. As illustrated in FIG. 15, the camera FOVs 520 and the radar FOVs 620 may overlap.

Figure 16:
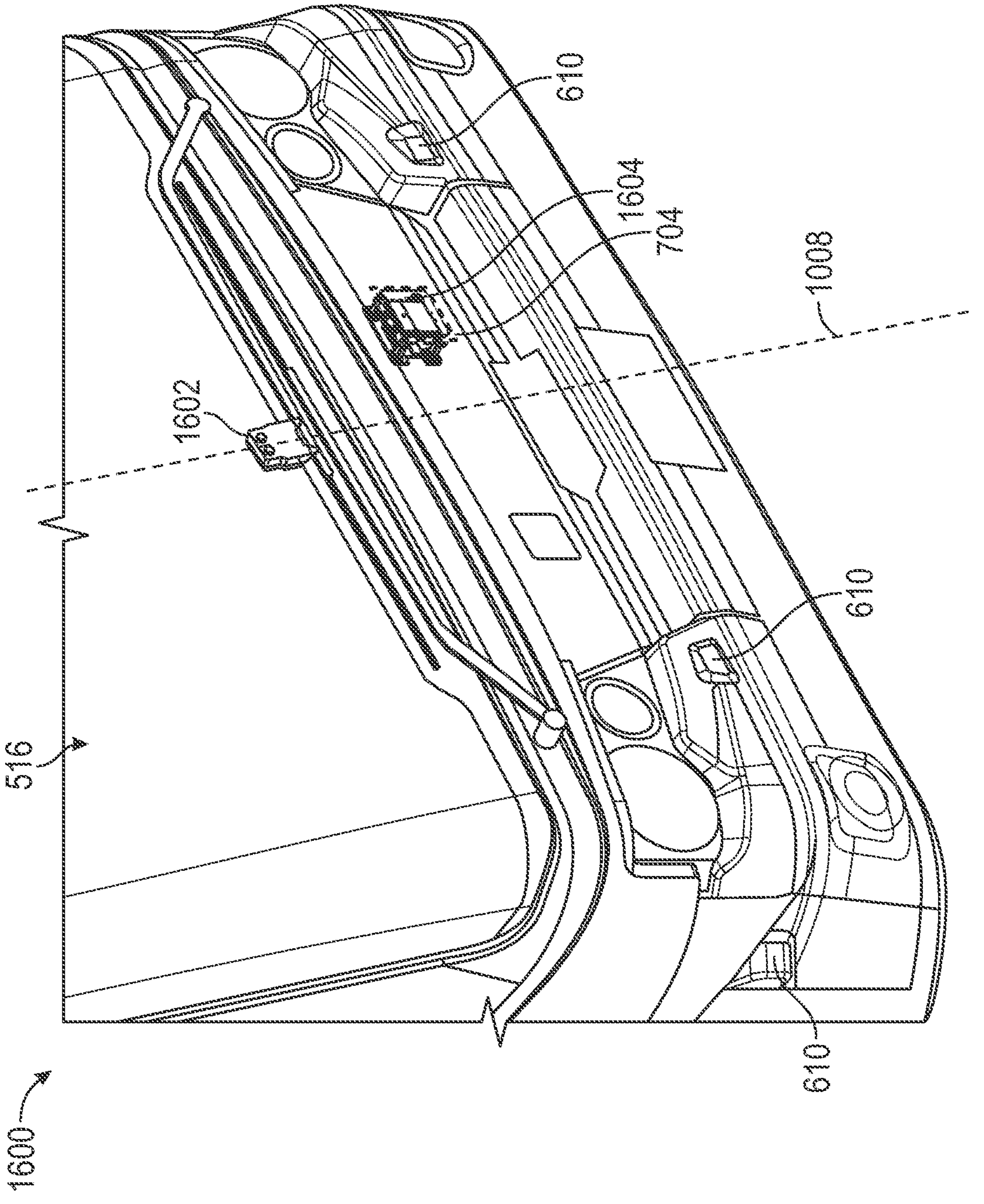
FIG. 16 is perspective view of a cab of the refuse vehicle of FIG. 1 equipped with the advanced driver-assistance system of FIG. 6 and including a forward collision system, according to an exemplary embodiment.
Figure 17:
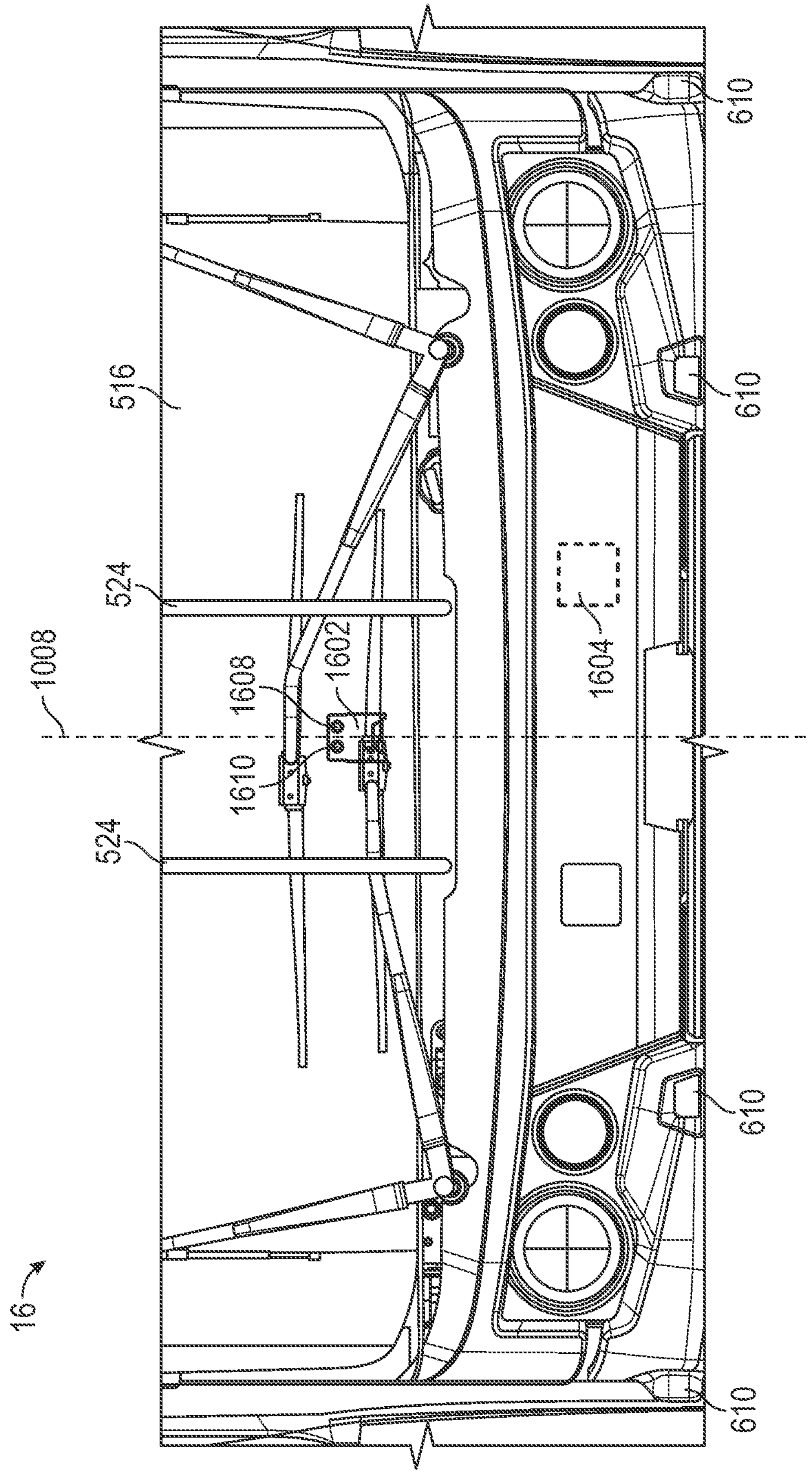
FIG. 17 is a front view of the cab of FIG. 16.

As shown in FIGS. 16-17, the ADAS 400 additionally or alternatively includes a forward collision system, shown as collision detection system 1600, with sensors, shown as a forward camera 1602 and a forward radar sensor 1604, integrated into the cab 16 of the refuse vehicle 10. In some embodiments, the collision detection system 1600 is a subsystem of the camera system 500 or the radar system 600. In some embodiments, the collision detection system 1600 is an independent system that provides data to the controller 402. The controller 402 can analyze the data provided by the collision detection system 1600 alone and/or in combination with other data and inputs (i.e., image data, radar data, control data, user inputs, etc.). In some embodiments, the forward camera 1602 and the forward radar sensor 1604 make up some or all of the sensors 414 of the ADAS 400. In some embodiments, the forward radar 1604 is positioned behind a cover, shown as cover 704, composed of radar-transmissive material to facilitate the operation of forward radar 1604.

With specific reference to FIG. 17, the forward camera 1602 is positioned on an interior surface of the windshield 516 (i.e., on a surface of the windshield 516 that is arranged within an interior of the cab 16). The forward camera 1602 may be positioned approximately on the longitudinal centerline 1008 of the refuse vehicle 10. In some embodiments, the forward camera 1602 can be positioned +/−10% of a width of windshield 516 from the longitudinal centerline 1008. In some embodiments, the forward camera 1602 can be positioned within +/−6% of a width of windshield 516 from the longitudinal centerline 1008. In the illustrated embodiment, the forward camera 1602 can be centered on longitudinal centerline 1008. The exact position of forward camera 1602 may vary depending on the position of displays, input devices, and/or instrument clusters in the cab 16. For example, the forward camera 1602 can be positioned near the bottom of windshield 516 and behind a console display 420 of the user interface 416 to hide the camera from the view of an operator within cab 16. By being placed on an interior surface near the bottom of the windshield 516, wires for connecting the forward camera 1602 (when a wired configuration) can be routed into a dash of the interior of the cab 16.

Figure 18:
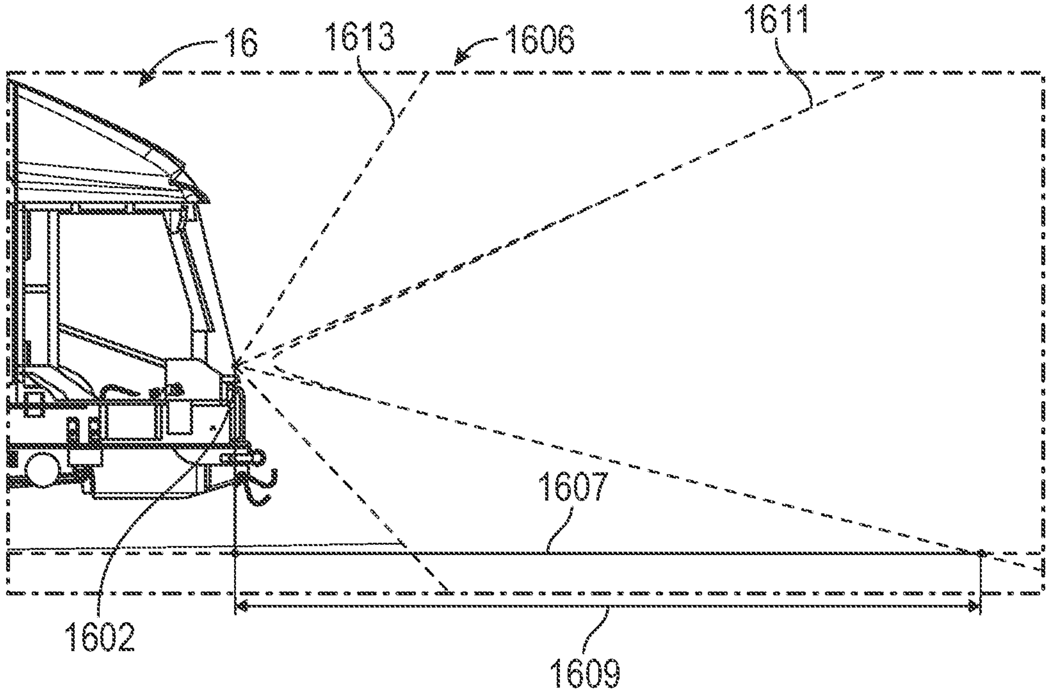
FIG. 18 is a side view of the cab of FIG. 16, including a field of view of the forward collision system, according to exemplary embodiment.

Referring now to FIGS. 17-18, the forward camera 1602 is positioned at a minimum height above the ground plane 1607 in order to provide the forward camera 1602 with an adequate field of view, shown as forward camera FOV 1606. For example, the forward camera 1602 may be positioned at a height between about 40 inches and about 120 inches above the ground plane 1607, or between about 45 inches and about 115 inches above the ground plane 1607, or between about 47 inches and about 110 inches above the ground plane 1607. The minimum height of the forward camera 1602 ensures that a predefined vision distance 1609 is defined by the forward camera FOV 1606. Specifically, the forward camera 1602 may include a main lens 1608 and a wide-angle lens 1610 (e.g., a fisheye lens), and the main lens 1608 defines a main lens FOV 1611 and the wide-angle lens 1610 defines a wide-angle FOV 1613. The predefined vision distance 1609 may be distance between the forward camera 1602 and the point where the main lens FOV 1611 intersects the ground plane 1607 (e.g., the vertical angle of view defined by the main lens FOV 1611 intersecting with the ground plane 1607). In some embodiments, the predefined vision distance is less than or equal to about 7 meters, which ensures that the forward camera 1602 can detect the ground at least about 7 meters in front of the cab 16.

In some embodiments, a position of the forward camera 1602 depends on the wiper path of wipers on the windshield 516. In general, the forward camera 1602 can be positioned to not be obstructed by a parked wiper blade. In some embodiments, the clearance between the forward camera FOV 1606 and the edge of a wiper blade path may be at least about 20 millimeters, or at least 40 millimeters.

Figure 19:
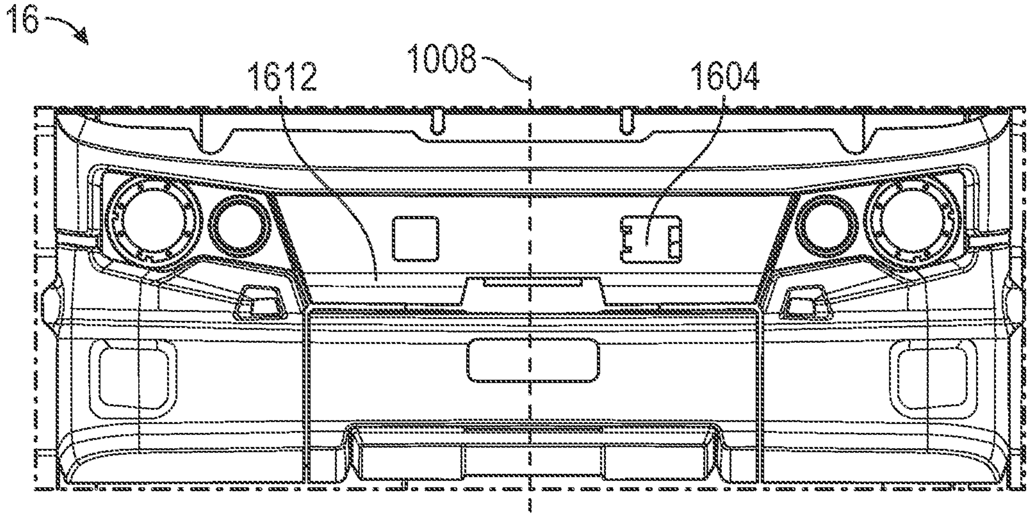
FIG. 19 is a front view of the cab of FIG. 16 illustrated a front radar sensor, according to another exemplary embodiment.
Figure 20:
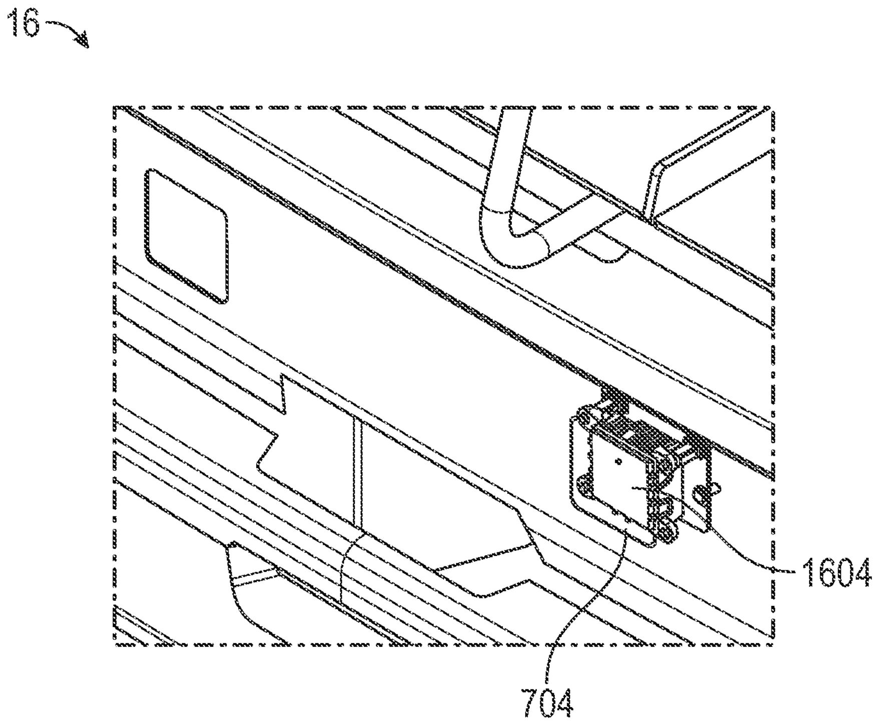
FIG. 20 is a perspective view of the cab and the front radar sensor of FIG. 19, according to another exemplary embodiment.
Figure 21:
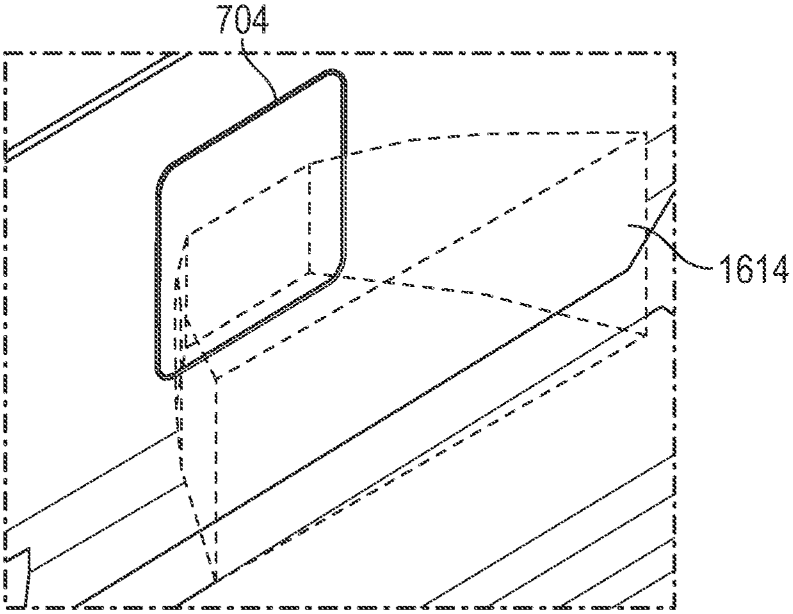
FIG. 21 is a perspective view of the front radar sensor of FIG. 19 illustrating a keep-out zone, according to an exemplary embodiment.

As shown in FIGS. 19-21, the forward radar 1604 is positioned behind a cover, such as cover 704, in a manner similar to the radar sensors 610. In some embodiments, a portion of a fascia 1612 of the cab 16 in front of forward radar 1604 is cut to allow for cover 704 to be positioned in front of forward radar 1604. In other words, the fascia 1612 may include one or more cutouts that receive the cover 704. As described above, the cover 704 may be composed a radar-transmissive material. The radar-transmissive material may have a low attenuation and/or low dielectric constant (e.g., ABS, polypropylene, polyamide, polycarbonate, PC-PCT, etc.) In some embodiments, the thickness of cover 704 limits the materials it can be composed of to avoid negatively affecting the forward radar 1604. For example, a cover 704 of less than 2 mm thick can be composed of ABS, polycarbonate, and/or polypropylene. In some embodiments, cover 704 is mounted at an angle less than 30 degrees but not parallel to the face of the forward radar 1604. In some embodiments, the forward radar 1604 is placed approximately on a longitudinal centerline 1008 of refuse vehicle 10. In some embodiments, the forward radar 1604 may be offset from the longitudinal centerline 1008. For example, the forward radar 1604 may be laterally offset about 10 inches from a vertical sensor line. The forward radar 1604 may have a "keep-out" zone, shown as keep out zone 1614, in front of the forward radar 1604.

ADAS Controls

In general, the controller 402 of the ADAS 400 is configured to operate the refuse vehicle 10 and/or its subsystems, attachments, assemblies, etc., according to various operation modes. As an ADAS, the controller 402 can a provide route information, monitor a human driver (i.e., for weariness, concentration, etc.), provide alerts to a human driver, control the movement of the refuse vehicle 10 (i.e., lane assist, cruise control, emergency braking, autonomous route tracking, parking, etc.), and/or communicate with a remote system or other vehicles to act in concert with one or more other vehicles. The controller 402 may also be configured to assist an operator of the refuse vehicle 10 with vocational activities (i.e., refuse collection). In some embodiments, the controller 402 generates control signals for one or more controllable elements 410 to assist the vocational activity. The control signals may include controlling the lift assembly 40, compaction assembly, articulating collection arm, etc. of the refuse vehicle 10. In some embodiments, the controller 402 can use sensor data and/or control data in both ADAS actions and vocational activity assistance.

In some embodiments, the controller 402 is configured to determine an operation mode based on the sensor data and/or control data. In some embodiments, the controller 402 can filter sensor data through the vehicle control data to identify false events. The false events can be sensor-detected events that are due to one or more controllable elements 410 of the refuse vehicle 10 (i.e., lift assembly 40). In some embodiments, the controller 402 is configured to determine the one or more sensors 414 from which sensor data should be obtained from. Depending on the configuration of the refuse vehicle 10, a subset of sensors can be deactivated and a subset of sensors in a more preferable location can be activated. The controller 402 can be configured to determine the appropriate sensors based on sensor data and/or control data. In some embodiments, the controller 402 is configured to generate control signals for controllable elements 410 to control the movement of refuse vehicle 10 and/or its subsystems in response to receiving a user input, command, a request, etc. In some embodiments, the controller 402 is configured to generate control signals for one or more controllable elements 410 based on the sensor data and/or control data. In some embodiments, the controller 402 is configured to display different views via the user interface 416 based on the determined operation mode. The views can incorporate the sensor data and/or the control data relevant to the determined operation mode. The operation modes may include, for example, a collection mode, a forward mode, a reverse mode, a compaction mode, a dumping mode, and/or still other modes. In some embodiments, two or more modes may be active simultaneously. In some embodiments, once in a first operation mode, the controller 402 will not transition to a second operation mode until a set of conditions has first been met.

Sensor Data Filtering

Figure 22:
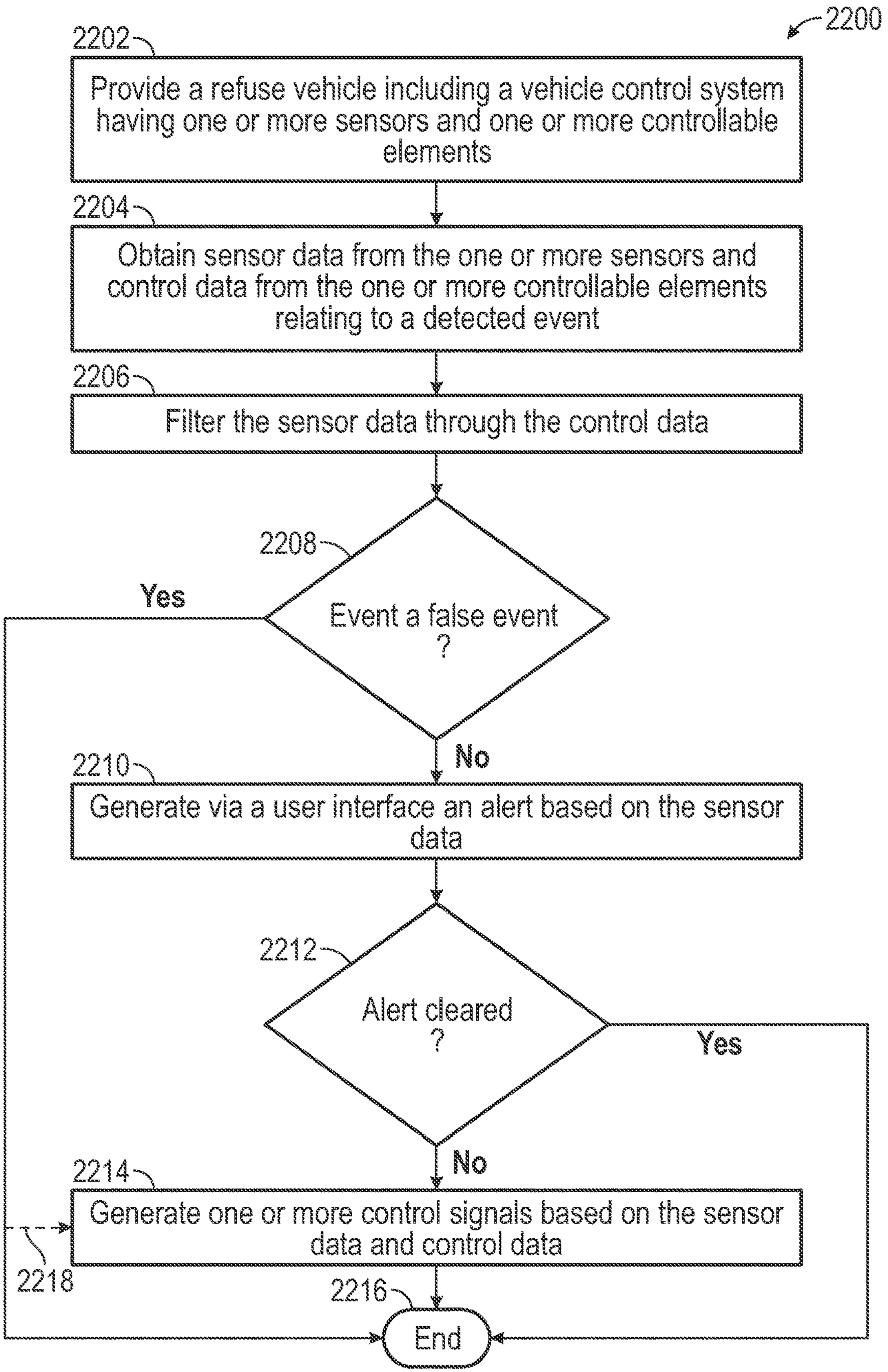
FIG. 22 is a flow diagram of a method for filtering sensor data, according to an exemplary embodiment.

Referring now to FIG. 22, a process or method 2200 for filtering sensor data is shown, according to an exemplary embodiment. In some embodiments, the method 2200 is performed by one or more components of refuse vehicle 10. For example, the method 2200 can be performed by the controller 402 of the ADAS 400.

In some embodiments, the method 2200 includes providing a refuse vehicle (e.g., the refuse vehicle 10) including an ADAS system (e.g., the ADAS 400) having one or more sensors and one or more controllable elements at step 2202. Controllable elements may be the same or similar to controllable elements 410. In some embodiments, controllable elements include a prime mover, steering components, power transmission or driver components, braking components, lift assemblies, electric actuators, hydraulic actuators, electric motors, systems, subsystems, assemblies, and/or any other components of the refuse vehicle 10 controllable by an operator or by the controller 402. In some embodiments, provided sensor can be the same or similar to sensors 414. In some embodiments, the sensors can include the camera system 500, the radar system 600, and the collision detection system 1600.

In some embodiments, the method 2200 includes obtaining data from the one or more sensors and the one or more controllable elements relating to a detected event at step 2204. In some embodiments, the data obtained includes sensor data and/or control data. The sensor data can include image data, proximity data, and or other types of data. The control data can include the position, direction of movement, speed, and/or acceleration of controllable elements 410. The control data may also include a list of past control signals provided to controllable elements 410. In some embodiments, the data is obtained from the one or more sensors via an Ethernet bus. In some embodiments, the sensors 414, including the cameras 510, the hopper camera 522 (both visible light and thermal imaging sensors), the radar sensors 610, the forward camera 1602, and the forward radar 1604 can all be connected to the Ethernet bus for transmitting information to the controller 402. The Ethernet bus may be composed of copper using a coax line or differential twisted pairs. In some embodiments, the Ethernet bus is a fiber-optic line.

In some embodiments, the detected event is the presence of an obstacle. For example, when lift assembly 40 interfaces with carry can 200, sensor data from the forward radar 1604 may indicate the presence of an obstacle. The sensor data relating to this event may be provided to the controller 402. In some embodiments, the control data is the data received from one or more controllable elements at the time the sensor data indicated the presence of the obstacle. In some embodiments, the detected event may be based on a user input. For example, the detected event can be a movement of a joystick of the user interface 416. In some embodiments, all sensor data is filtered by the corresponding control data. For example, the controller 402 may constantly be comparing sensor data to control data to identify, based on the control data, instances where the sensor data includes false events.

In some embodiments, the method 2200 includes filtering the sensor data through the control data at step 2206. The controller 402 may be configured to filter the sensor data through the vehicle control data to identify, remove, and/or tag false events from the sensor data. False events may be instances of sensor data that appear to indicate one or more objects are present around refuse vehicle 10, but actually are due to refuse vehicle 10 itself and/or one or more of its components. The filter process can include using the control data to identify the position of one or more components of refuse vehicle 10 and comparing that position to the detected object in the sensor data. The sensor data observations that align with control data can be filtered out as false events. For example, the lift assembly 40 and/or the robotic arm 300 may interface with the carry can 60, 200 in a front, rear, or side of refuse vehicle 10 (e.g., in front of the cab 16 or at a side or rear of the body 14). The forward radar 1604 (or another radar sensor 610 on the rear or side of the body 14) can detect the carry can 60, 200 and/or the robotic arm 300 as an object and provide sensor data to the controller 402 indicating the positon, direction of movement, speed, and/or acceleration of the carry can 60, 200 and/or the robotic arm 300. The controller 402 can also receive control data indicating that the arms of lift assembly 40 are lowered and/or that the robotic arm 300 is extended or retracted. If the sensor data is not compared to the control data, the controller 402 may analyze the sensor data and determine an object is present. If the sensor data is filtered through the control data, the controller 402 can compare the filter sensor data and the control data and determine, at step 2208, that the sensor data is a false event due to the carry can 60, 200 and/or the robotic arm 300 being intentionally manipulated and that no external object is present.

In some embodiments, if a false event is detected, the sensor data that the alert is based on may be removed, tagged, ignored, and/or adjusted by the controller 402. For example, during the filtering process, the controller 402 can tag all sensor data that is determined to be due to one or more components of refuse vehicle 10, based on the control data, as false event data, and not generate one or more control signals based on the false event data. In some embodiments, if the event is determined to be a false event, method 2200 proceeds directly to step 2216 and ends. In some embodiments, if the event is determined not to be a false event, method 2200 includes proceeding to step 2210.

In some embodiments, method 2200 includes generating, via a user interface, an alert based on the sensor data at step 2210. The alert may be a visual alert via a display (i.e., the instrument display 418, the console display 420, etc.), and/or an auditory alert via the alert devices 424. In some embodiments, the alert includes a recommended control action for a user to perform. For example, the ADAS 400 via the radar system 600 and radar sensors 610 may detect a vehicle in a blind spot of the refuse vehicle 10, and the controller 402 can generate an alert to a driver indicating the presence of the vehicle. In another example, the refuse vehicle 10 may be stopped, and the ADAS 400 senses fast approaching objects from the rear of the refuse vehicle 10. The controller 402 can generate visual, audible, and/or haptic alerts that are apparent from outside of the refuse vehicle 10 and/or the alerts themselves are external to the refuse vehicle 10 to alert those around refuse vehicle 10 of the approaching objects. In some embodiments, the alerts are audible natural-language based alerts. Audible natural-language based alerts can explain with language (according to a user preference for example) the content of the alert. For example, the alert may include an audible natural-language based alert saying "Vehicle in blind spot." Natural language based alerts allow a user to understand what an alert is for without any other supplemental information. In some embodiments, the alerts can indicate information about the refuse vehicle 10. For example, alerts may include a tire pressure of the refuse vehicle 10 while operating.

In some embodiments, the method 2200 includes determining if the alert is cleared at step 2212. For example, a user may clear an alert via a user input to the user interface 416. Alerts may also be cleared automatically by the controller 402. In some embodiments, the controller 402 automatically clears alerts if the underlying event that triggered the alert is no longer detected. For example, an alert of a car in a blind spot of the refuse vehicle 10 may persist so long as the car is in the blind spot. Once the car leaves the blind spot, the controller 402 may automatically clear the alert. In some embodiments, if the alert is cleared, method 2200 proceeds to step 2216 and ends. In some embodiments, if the alert is not cleared, method 2200 proceeds to step 2214.

In some embodiments, the method 2200 includes generating one or more control signals based on the sensor data and control data at step 2214. The controller 402 can be configured to generate control signals based on the sensor data and control data in response to an actual event (i.e., not a false event). Control signals may be commands to operate the refuse vehicle 10 and/or one or more components of the refuse vehicle 10. For example, sensor data indicate an object (e.g., a vehicle) ahead of the refuse vehicle 10 and the controller 402 may generate an alert indicating this event. The sensor data may indicate that the refuse vehicle 10 is traveling at a sufficient speed that it will collide with the object if the speed is not diminished. If the alert is not cleared (i.e., before a time threshold, where the time threshold is the point in time determined by the controller 402 where action must be taken to avoid a collision), the controller 402 can generate control signals to activate the brakes of the refuse vehicle 10 and prevent the collision. In some embodiments, the control signals may also control components of the refuse vehicle 10 including actuators, motors, lift assemblies, etc. In some embodiments, the method 2200 skips steps 2210 and 2212 and proceeds directly to generating one or more control signals via at step 2218. The controller 402 can be configured to automatically generate one or more control signals in emergencies where there is not enough time to generate an alert and wait for it to be cleared. For example, the controller 402 may determine that a control action such as emergency braking should be taken immediately in order to avoid an accident.

Operation Mode Views

Figure 23:
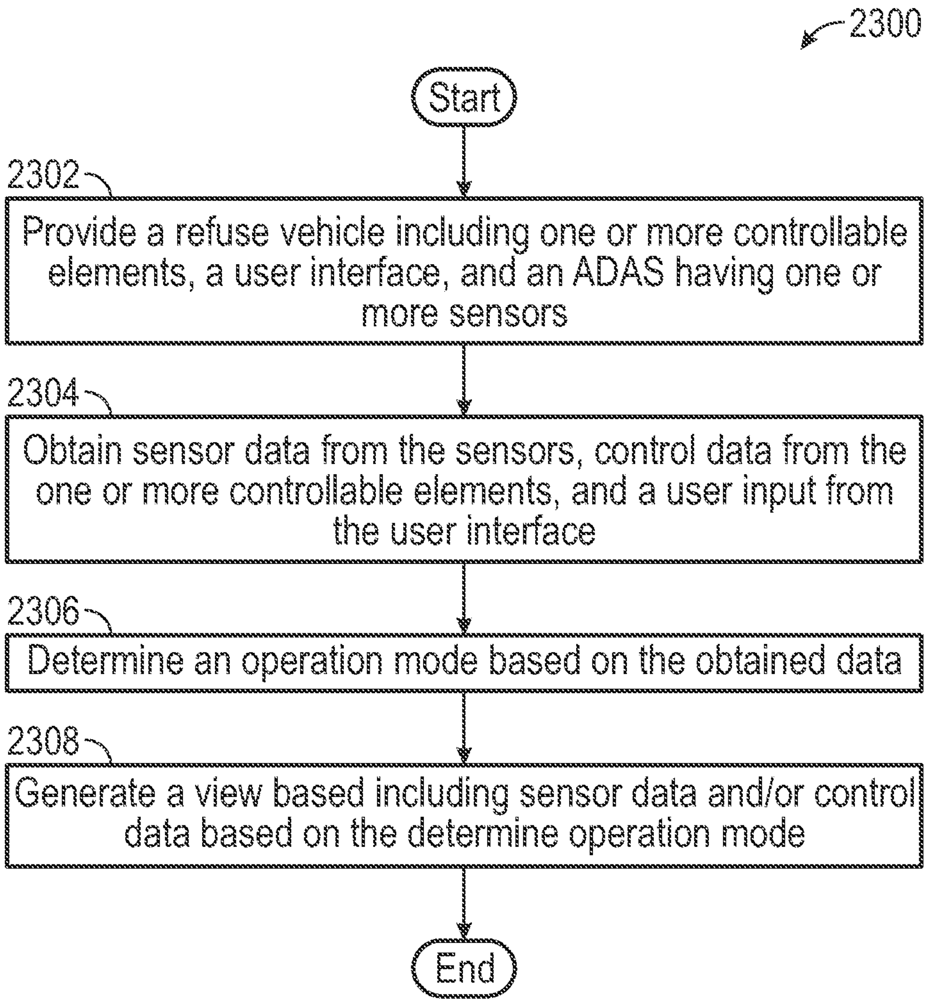
FIG. 23 is a flow diagram of a method for determining an operation mode of a refuse vehicle, according to an exemplary embodiment.

Referring now to FIG. 23, a process or method 2300 for automatically displaying one or more views based on a determined operation mode is shown, according to an exemplary embodiment. In some embodiments, method 2300 is performed by one or more components of refuse vehicle 10. For example, method 2300 can be performed by the controller 402 of the ADAS 400.

In some embodiments, the method 2300 includes providing a refuse vehicle one or more controllable elements, a user interface, and an ADAS having one or more sensors at step 2302. In some embodiments, the controllable elements can be the controllable elements 410, a user interface can be the user interface 416, and an ADAS can be the ADAS 400 with the one or more sensors 414. In some embodiments, the method 2300 includes obtaining sensor data from the sensors, control data from the controllable elements, and a user input from the user interface at step 2304. The user input may be the movement of an input device 422 of user interface 416. For example, the user input can be a user pressing a joystick. In some embodiments, the control data includes position, speed, direction of travel, and/or acceleration of the refuse vehicle 10. In some embodiments, the sensor data includes image data and/or proximity data from one or more sensors 414 including the cameras 510 of the camera system 500, the radar sensors 610 of the radar system 600, and/or the forward camera 1602 and the forward radar 1604 of the collision detection system 1600.

In some embodiments, the method 2300 includes determining, at step 2306, an operation mode based on the obtained data at step 2304. The controller 402 can be configured to analyze obtained data (i.e., sensor data, control data, user input(s), etc.), and determine from the obtained data an operation mode of the refuse vehicle 10. The operation modes may include, for example, a collection mode, a forward mode, a reverse mode, a compaction mode, a dumping mode, and/or still other modes. In some embodiments, the operation mode is based on a user input. For example, the controller 402 may automatically transition the refuse vehicle 10 into a collection mode when a driver presses a joystick of the user interface 416 that controls the lift assembly 40 or the robotic arm 300. In some embodiments, the operation mode is determined based on a combination of one or more of sensor data, control data, and user inputs. For example, a user input may indicate a transition to a collection mode, but later control data indicating a speed of 25 miles per hour (MPH) may indicate a forward mode.

In some embodiments, the controller 402 is provided a pre-defined list (e.g., lookup table) of operation modes and various requirements for activation. The list can include multiple ways of activating or indicating an operating mode to the controller 402. For example, a driver may input via the user interface 416 a command to enter a collection mode, a driver may audibly command the refuse vehicle 10 enter collection mode, or the controller 402 may automatically enter the collection mode when a refuse container is identified in a collection zone of the refuse vehicle 10 (e.g., by one of the cameras 510 or one of the radar sensors 610). In some embodiments, the controller 402 is configured to monitor the obtained data and learn when data and/or inputs can be reasonably associated with a collection mode. For example, the controller 402 can be configured to monitor a joystick of the user interface 416 that controls the lift assembly 40 or the robotic arm 300, and determine that each time the joystick is activated in a leftward motion; it is then followed by a command to activate the lift assembly 40 or the robotic arm 300. The controller 402 can determine that the refuse vehicle 10 is in a collection mode based on the activation of the lift assembly 40 or the robotic arm 300, and in some embodiments, the controller 402 can thereby associate leftward movement of the joystick with indicating the collection mode. In some embodiments, once in a first operation mode, the controller 402 will not transition to a second operation mode until a set of conditions has first been met. In some embodiments, two or more modes may be active simultaneously.

In some embodiments, the method 2300 includes generating a view including sensor data and/or control data, at step 2308, based on the operation mode determined at step 2306. The views can be provided on one or more of the displays of the user interface 416. The controller 402 can be configured to provide different information to different displays of user interface 416 based on the operation mode. The different information can include information from one or more separate systems of the refuse vehicle 10. The controller 402 can be configured to integrate the various systems into a single system, such as the ADAS 400, to provide centralized access and control with improved contextual awareness, to an operator. The systems can include the camera system 500, the radar system 600, the collision detection system 1600, and the controllable elements 410 (i.e., lift assembly 40) of the refuse vehicle 10. In some embodiments, the view(s) generated by the controller 402 include information from one or more of the above systems. For example, the views can incorporate the sensor data and/or the control data relevant to the determined operation mode. A feed from the hopper camera 522 and a feed from the camera system 500 can be combined and provided to an operator via the same display. By integrating the various systems into a single control system, the controller 402 can provide enhanced control and monitoring ability to an operator. In some embodiments, data and/or feeds that would otherwise be permanently display on independent monitors are integrated into the ADAS 400 by the controller 402 allowing the controller 402 to control the various feeds and display in a unified interface that displays the information necessary based on the determined operational mode.

In some embodiments, the controller 402 is configured with a predefined list of views corresponding to the operation mode. The list may also correlate views to vehicle type (i.e., a front-end loader may have different views available compared than a rear-end loader). The displays of the user interface 416 (i.e., instrument display 418 and console display 420) may be controlled independently, and may display different information based on the same operation mode. For example, when a joystick of the user interface 416 is pressed, the controller 402 can determine that the refuse vehicle 10 is in a collection mode and automatically update console display 420 of user interface 416 to display image data from the hopper camera 522 and a curbside camera (e.g., one of the cameras 510 arranged on a side or a front of the refuse vehicle 10). This can aid the operator during a collection mode by providing a view of the lift arm and the surrounding area. The controller 402 can also automatically update the instrument display 418 of the user interface 416 based on the collection mode with the reverse image feed (i.e., from a rearward facing cameras 510 of the camera system 500) and/or the 360 composite view. This can be beneficial when a refuse vehicle goes from house to house and needs to pull back onto a road. Each display can be provided a unique view based on the determined operation mode. In some embodiments, the views are only generated for the console display 420 of user interface 416, and the instrument display 418 can permanently display material information such as a reverse camera video feed, speed, fuel level, battery charge, etc.

In some embodiments, the views are bound by a set of criteria, and the controller 402 can be configured to always display specific data based on the criteria no matter the operation mode and corresponding view. For example, rules/criteria can be applied requiring that the image data from the reverse camera be always displayed on the instrument display 418 regardless of the operation mode. Contextual information dependent on the operation mode can still be displayed around the reverse video feed on the instrument display 418.

In some embodiments, the views persist until a new mode is determined. For example, once in collection mode, the refuse vehicle 10 can stay in collection mode until the vehicle reaches 25 MPH. The controller 402 can be configured to determine, based on the control data or the sensor data, the speed of refuse vehicle 10 and transition from the collection mode to another mode, for example, a forward mode.

Sensor Selection

Figure 24:
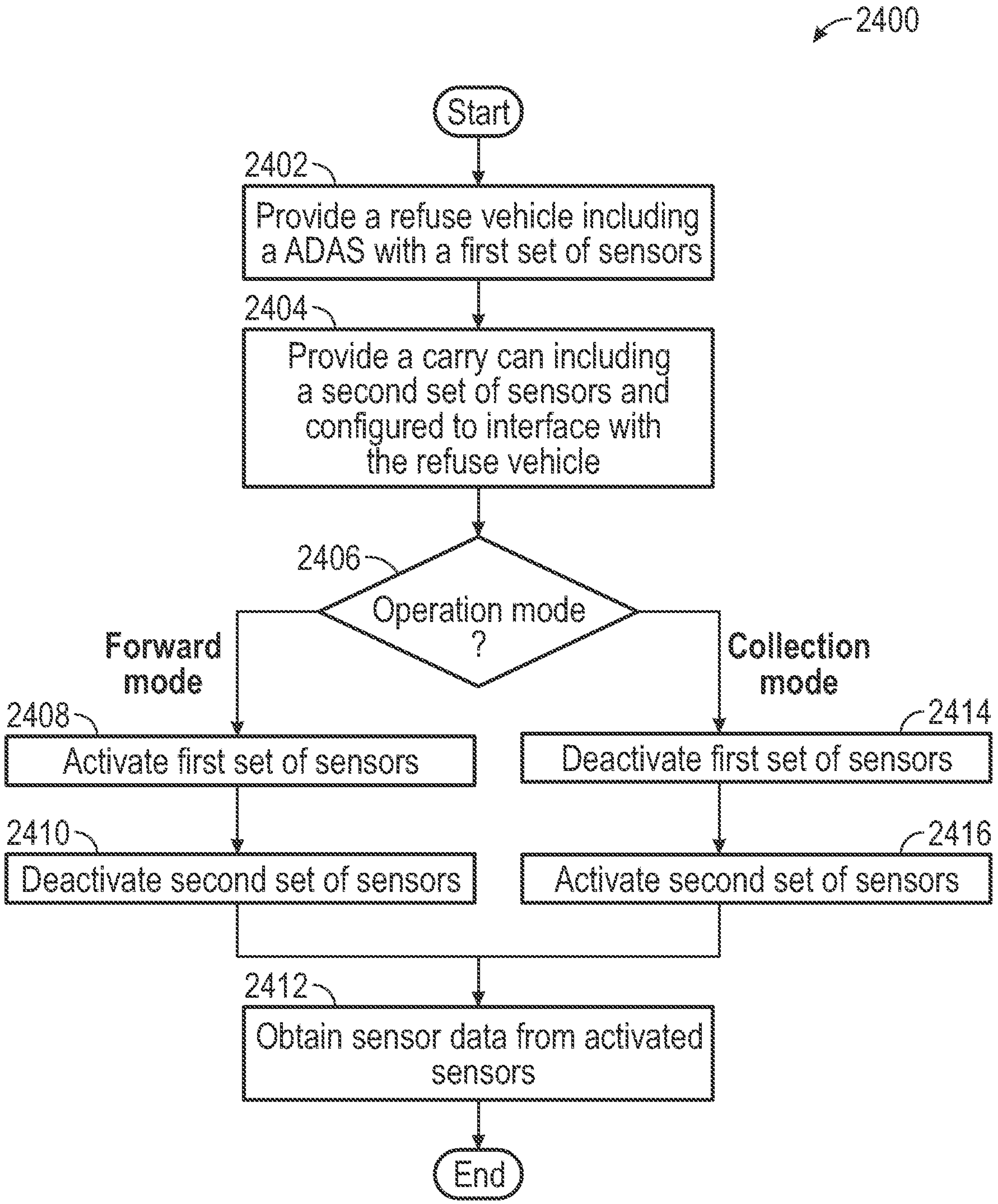
FIG. 24 is a flow diagram of a method for selecting sensors in an advanced driver-assistance system, according to an exemplary embodiment.

Referring now to FIG. 24, a process or method 2400 for automatically selecting sensors based on the operation mode is shown, according to an exemplary embodiment. In some embodiments, method 2400 is performed by one or more components of refuse vehicle 10. For example, method 2200 can be performed by controller 402 of ADAS 400. In some embodiments, controller 402 can select which sensors to activate, obtain data from, and/or analyze the data of based on the operating mode of refuse vehicle 10 and/or its configuration.

In some embodiments, method 2400 includes providing a refuse vehicle including an ADAS with a first set of sensors at step 2402. The sensors can be the sensors 414 of the ADAS 400. In some embodiments, the first set of sensors is a subset of the sensors 414. In some embodiments, the first set of sensors is comprised of sensors 414 all meeting a certain criteria. For example, the first set of sensors may be all forward looking sensors, all sensors that would be interfered with by a carry can 200, all cameras 510, all radar sensors 610, etc. Still in other embodiments, the first set of sensors can be all sensors installed on the refuse vehicle 10.

Figure 25:
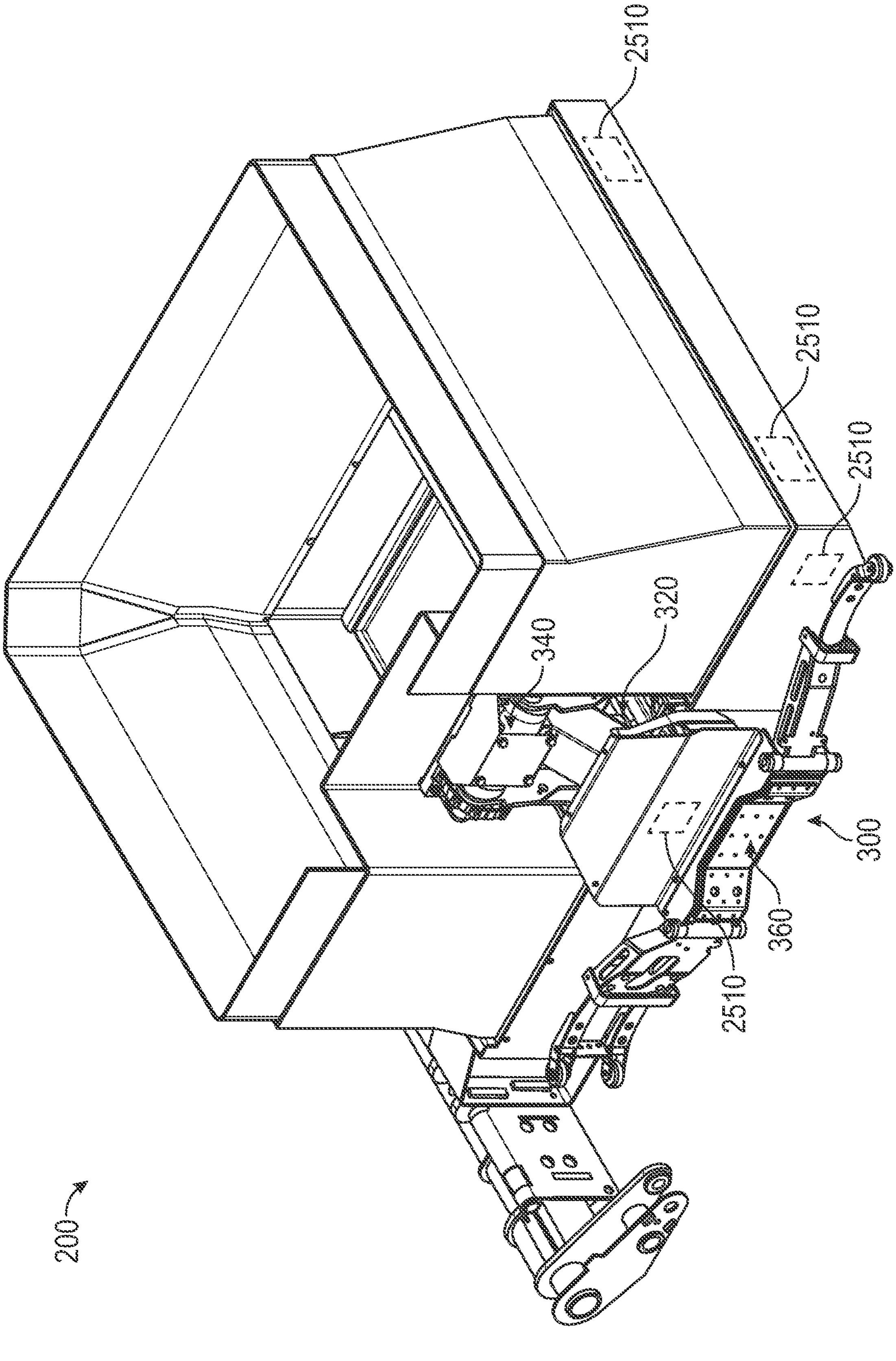
FIG. 25 is a perspective view of a carry can for the refuse vehicle of FIG. 1 having one or more sensors, according to an exemplary embodiment.

In some embodiments, method 2400 includes providing a carry can including a second set of sensors and configured to interface with the refuse vehicle at step 2404. Referring now to FIG. 25, the carry can 200 can be configured to include one or more sensors, shown as sensors 2510. Sensors 2510 can be communicably coupled to the ADAS 400 when the carry can 200 interfaces with the lift assembly 40 of refuse vehicle 10. For example, a pigtail connection can be provided between the carry can 200 and the refuse vehicle 10. In some embodiments, a pin and contact pad type connection may be used. It should be understood than any type of electrical connection between the sensors 2510 and the ADAS 400 configured to exchange information may be provided. In some embodiments, the sensors 2510 are wirelessly connected to the ADAS 400. The sensors 2510 can be any type of sensor described above (e.g., cameras, radar sensors, etc.). For example, the sensors 2510 may include radar sensors similar to the radar sensors 610 for detecting the position, speed, direction of travel, and acceleration of an object external to the refuse vehicle 10. The radar sensors can be positioned on the carry can 200 such that in collection mode, when the carry can 200 is held in front of refuse vehicle 10, the sensors 2510 are positioned approximately horizontally and in approximately the same z-plane as the radar sensors 610 of the radar system 600.

Referring back to FIG. 24, in some embodiments, the method 2400 includes determining the operation mode of refuse vehicle 10 at step 2406. In some embodiments, step 2406 is the same and/or similar to step 2306 of the method 2300. The controller 402 can be configured to analyze sensor data, control data, and/or user inputs and determine an operation mode of the refuse vehicle 10. If the controller 402 determines the operation mode is a forward mode at step 2406, method 2400 is shown proceeding to step 2408.

In some embodiments, the method 2400 includes activating the first set of sensors at step 2408. In the forward mode, in some embodiments, the carry can 200 is raised in a transportation position above the body 14 of the refuse vehicle 10. As explained above, in some embodiments, the first set of sensors can be all forward-facing radar sensors 610 of the ADAS 400. In this embodiment, the carry can 200 may not be interfering with the first set of sensors installed on the refuse vehicle 10 when in forward mode and the controller 402 can be configured to accordingly activate the first set of sensors for use in the ADAS 400. In some embodiments, the sensors are always active, and the controller 402 can be configured to analyze only the data obtained from the first set of sensors. In some embodiments, all sensors are activate and the controller 402 is configured to weight the data obtained from the first set of sensors greater than the data from the second set of sensors.

In some embodiments, the method 2400 includes deactivating the second set of sensors at step 2410. In some embodiments, in forward mode with the carry can 200 in a transportation position above the refuse vehicle 10, the data from the second set of sensors on the carry can 200 may be not useful for control operations. For example, as described above with reference to FIGS. 11-14, in some embodiments, the radar sensors 610 are placed on approximately the same z-plane. When in a transportation mode, the sensors 2510 of the second set may be on a different z-plane, and it may not be desirable to integrate the data from the different orientations. Accordingly, the controller 402 can deactivate/ignore the second set of sensors on the carry can 200 in the forward mode.

In some embodiments, the method 2400 includes obtaining sensor data from the activated sensors at step 2412. The obtained data may be provided to the ADAS 400. In some embodiments, the sensors are not physically deactivated, and data is obtained from both sets of sensors. The controller 402 may instead be configured to only analyze the data from one set based on the operation mode.

Referring back to step 2406, in some embodiments, if the controller 402 determines the operation mode is a collection mode, the method 2400 may proceed to step 2414. In some embodiments, step 2414 includes deactivating the first set of sensors. In a collection mode, carry can 200 may be positioned in front of the refuse vehicle 10. The carry can 200 can interfere with the forward radar sensors 610 and provide the ADAS 400 with data indicating false events based on the detection of the carry can 200. In some embodiments, the first set of sensors may include all sensors whose operation is interfered with by the position of the carry can 200 (e.g., the forward-facing cameras 510, the forward-facing radar sensors 610, the collision detection system 1600, etc.). To maintain the operation of the ADAS 400, in some embodiments, the controller 402 can be configured to deactivate the first set of sensors, and activate the second set of sensors on the carry can 200 at step 2416. By deactivating the first set of sensors and activating the second set of sensors, the ADAS 400 can maintain a 360-degree view around the refuse vehicle 10 and avoid instances of interference. In some embodiments, the method 2400 finally includes obtaining sensor data the activated sensors at step 2412.

While the method 2400 is shown illustrating the process for selecting sensors based on a forward mode and a collection mode, the method 2400 can also be applied to the selection of sensors for other operation modes of the refuse vehicle 10. The composition of the first set of sensors and the second set of sensors can also vary. It should be understood by a person of ordinary skill in the art in view of the present application that the sets of sensors can be determined by controller 402 based on the operation mode and vary accordingly.

Configuration of Exemplary Embodiments

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. It should be appreciated that other elements of the various embodiments may be incorporated or utilized with any of the other embodiments disclosed herein.

The invention claimed is:

1. A refuse vehicle comprising:

a chassis coupled to a wheel;

a motor configured to drive the wheel;

a body assembly coupled to the chassis, the body assembly defining a refuse compartment;

a lift assembly;

a carry can configured to selectively couple to the lift assembly, the carry can including:

a collection arm having an actuator configured to extend and retract the collection arm; and a carry can sensor; and a vehicle control system including a sensor integrated into the body assembly and a controller in communication with the lift assembly and the sensor, wherein an electrical connection extending between the carry can and the controller is configured to facilitate transferring carry can sensor data from the carry can sensor to the controller, the controller including a processor and at least one memory and being configured to:

receive sensor data from the sensor, the sensor data indicating an objection-detection event;

receive control data indicating a state of the lift assembly;

compare the sensor data to the control data to determine if the objection-detection event is a false event associated with the state of the lift assembly or an actual event;

determine that the lift assembly is in a collection mode; and deactivate the sensor and activate the carry can sensor.

2. The refuse vehicle of claim 1, wherein the controller is further configured to:

generate an alert in response to determining that the objection-detection event is the false event.

3. The refuse vehicle of claim 1, wherein the controller is further configured to:

initiate a control action in response to determining the objection-detection event is the actual event.

4. The refuse vehicle of claim 3, wherein the control action is activating a brake to slow down a rotational speed of the wheel.

5. The refuse vehicle of claim 1, further comprising:

a refuse container configured to selectively couple to the lift assembly; and a collection arm coupled to the refuse container and configured to extend and retract;

wherein the controller is further configured to determine that the objection-detection event is the false event when the sensor data indicates that the sensor detected at least one of the refuse container or the collection arm and the control data indicates that the lift assembly or the collection arm is in an activated state.

6. The refuse vehicle of claim 1, further comprising:

a cab supported by the chassis; and wherein the vehicle control system includes a front camera mounted to the cab, wherein the front camera defines a field of view that intersects with a ground plane, and wherein a predefined vision distance defined between the front camera and a point where the field of view intersects with the ground plane is less than or equal to about 7 meters.

7. A refuse vehicle comprising:

a chassis;

a body assembly coupled to the chassis, the body assembly defining a refuse compartment;

a lift assembly;

a refuse container configured to selectively couple to the lift assembly, the refuse container including a carry can sensor; and a vehicle control system including a vehicle sensor integrated into the body assembly and a controller in communication with the lift assembly, the carry can sensor, and the vehicle sensor, the controller including a processor and at least one memory and being configured to:

determine that the lift assembly is in a collection mode; and in response to determining that the lift assembly is in the collection mode, deactivate the vehicle sensor and activate the carry can sensor.

8. The refuse vehicle of claim 7, wherein the controller is further configured to:

receive sensor data from the vehicle sensor, the sensor data indicating an objection-detection event;

receive control data indicating a state of the lift assembly; and compare the sensor data to the control data to determine if the objection-detection event is a false event associated with the state of the lift assembly or an actual event.

9. The refuse vehicle of claim 8, wherein the controller is further configured to:

generate an alert in response to determining that the objection-detection event is the false event.

10. The refuse vehicle of claim 8, wherein the controller is further configured to:

initiate a control action in response to determining the objection-detection event is the actual event.

11. The refuse vehicle of claim 10, wherein the control action is activating a brake to slow down a rotational speed of a wheel.

12. The refuse vehicle of claim 8, further comprising:

a collection arm coupled to the refuse container and configured to extend and retract;

wherein the controller is further configured to determine that the objection-detection event is the false event when the sensor data indicates that the sensor detected at least one of the refuse container or the collection arm and the control data indicates that the lift assembly or the collection arm is in an activated state.

13. The refuse vehicle of claim 7, wherein an electrical connection extending between the refuse container and the controller is configured to facilitate transferring carry can sensor data from the carry can sensor to the controller.

14. The refuse vehicle of claim 7, further comprising:

a cab supported by the chassis; and wherein the vehicle control system includes a front camera mounted to the cab, wherein the front camera defines a field of view that intersects with a ground plane, and wherein a predefined vision distance defined between the front camera and a point where the field of view intersects with the ground plane is less than or equal to about 7 meters.

15. A refuse vehicle comprising:

a chassis;

a cab supported by the chassis;

a body assembly coupled to the chassis, the body assembly defining a refuse compartment;

a lift assembly; and a vehicle control system including a vehicle sensor integrated into the body assembly and a front camera mounted to the cab, wherein the front camera defines a field of view that intersects with a ground plane, wherein a predefined vision distance defined between the front camera and a point where the field of view intersects with the ground plane is less than or equal to about 7 meters, and wherein the vehicle control system includes a controller in communication with the lift assembly and the vehicle sensor, the controller being configured to:

determine that the lift assembly is in a collection mode; and deactivate the vehicle sensor and activate a carry can sensor on a refuse container.

16. The refuse vehicle of claim 15, wherein the controller includes a processor and at least one memory and is configured to:

receive sensor data from the vehicle sensor, the sensor data indicating an objection-detection event;

receive control data indicating a state of the lift assembly; and compare the sensor data to the control data to determine if the objection-detection event is a false event associated with the state of the lift assembly or an actual event.

* * * * *